US010730327B2

(12) United States Patent
Horade

(10) Patent No.: US 10,730,327 B2
(45) Date of Patent: *Aug. 4, 2020

(54) INKJET RECORDING APPARATUS CAPABLE OF DISPLAYING NOTIFICATION SCREEN THAT PROMPTS USER TO CHECK RESIDUAL INK QUANTITY IN INK CHAMBER

(71) Applicant: BROTHER KOGYO KABUSHIKI KAISHA, Nagoya-shi, Aichi-ken (JP)

(72) Inventor: Kenta Horade, Tokai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 119 days.

This patent is subject to a terminal disclaimer.

(21) Appl. No.: 15/874,980

(22) Filed: Jan. 19, 2018

(65) Prior Publication Data
US 2018/0207967 A1 Jul. 26, 2018

(30) Foreign Application Priority Data
Jan. 20, 2017 (JP) .................................. 2017-008435

(51) Int. Cl.
B41J 29/38 (2006.01)
H04N 1/00 (2006.01)

(52) U.S. Cl.
CPC .......... *B41J 29/38* (2013.01); *H04N 1/00477* (2013.01); *H04N 2201/0094* (2013.01)

(58) Field of Classification Search
CPC . B41J 29/38; B41J 2/175; B41J 2/165; H04N 1/00477; H04N 2201/0094
See application file for complete search history.

(56) References Cited

U.S. PATENT DOCUMENTS

2010/0026741 A1 2/2010 Gold et al.
2015/0224783 A1* 8/2015 Koganehira ......... B41J 2/17509
347/9
(Continued)

FOREIGN PATENT DOCUMENTS

CN 102886988 A 1/2013
CN 103171307 A 6/2013
(Continued)

OTHER PUBLICATIONS

Related U.S. Appl. No. 15/874,959, filed Jan. 19, 2018.
(Continued)

*Primary Examiner* — Thinh H Nguyen
(74) *Attorney, Agent, or Firm* — Merchant & Gould P.C.

(57) ABSTRACT

An inkjet recording apparatus includes: a tank having an ink chamber and formed with an inlet; a recording head; a display configured to display a screen; and a controller configured to control the recording head and the display. The recording head is configured to eject the ink stored in the ink chamber to record an image on a sheet. The controller is configured to: execute a first determination process to determine whether a user is near the inkjet recording apparatus; and execute, after determination in the first determination process that the user is near the inkjet recording apparatus, a notification process to control the display to display a notification screen when the quantity of ink stored in the ink chamber is not less than a residual ink threshold. The notification screen prompts the user to check the quantity of ink stored in the ink chamber.

18 Claims, 12 Drawing Sheets

(56) References Cited

U.S. PATENT DOCUMENTS

| | | |
|---|---|---|
| 2016/0052288 A1 | 2/2016 | Kondo et al. |
| 2016/0059571 A1 | 3/2016 | Kobayashi |
| 2016/0207319 A1* | 7/2016 | Shirono ............... B41J 2/17513 |
| 2016/0207337 A1 | 7/2016 | Honoki et al. |
| 2016/0207339 A1 | 7/2016 | Honoki |
| 2016/0303857 A1 | 10/2016 | Genta et al. |

FOREIGN PATENT DOCUMENTS

| | | |
|---|---|---|
| CN | 105365395 A | 3/2016 |
| CN | 105984231 A | 10/2016 |
| CN | 106042648 A | 10/2016 |
| JP | 2012-201101 A | 10/2012 |
| JP | 2013-152685 A | 8/2013 |
| JP | 2016-132218 A | 7/2016 |
| JP | 2016-132220 A | 7/2016 |
| JP | 2016-132221 A | 7/2016 |
| WO | 2014/034109 A1 | 3/2014 |

OTHER PUBLICATIONS

Related U.S. Appl. No. 15/875,049, filed Jan. 19, 2018.
Related U.S. Appl. No. 15/875,073, filed Jan. 19, 2018.
Related U.S. Appl. No. 15/875,030, filed Jan. 19, 2018.
Office Action (Notice of Allowance) issued in related U.S. Appl. No. 15/875,030, dated Jan. 17, 2019.
InnovationQ Plus—IP.com search, Jan. 2, 2019, pp. 1-2.
Office Action issued in related U.S. Appl. No. 15/875,049, dated Oct. 4, 2018.
Office Action (Notice of Allowance) issued in related U.S. Appl. No. 15/875,049, dated Jan. 23, 2019.
Notification of First Office Action issued in related Chinese Patent Application No. 201810052718.3, dated Apr. 23, 2019.
Office Action (Notice of Allowance) issued in related U.S. Appl. No. 15/875,073, dated Mar. 11, 2019.
Office Action issued in related U.S. Appl. No. 15/874,959, dated Dec. 12, 2019.

* cited by examiner

US 10,730,327 B2

INKJET RECORDING APPARATUS CAPABLE OF DISPLAYING NOTIFICATION SCREEN THAT PROMPTS USER TO CHECK RESIDUAL INK QUANTITY IN INK CHAMBER

CROSS REFERENCE TO RELATED APPLICATION

This application claims priority from Japanese Patent Application No. 2017-008435 filed Jan. 20, 2017. The entire content of the priority application is incorporated herein by reference.

TECHNICAL FIELD

The present disclosure relates to an inkjet recording apparatus configured to record an image on a sheet.

BACKGROUND

Japanese Patent Application Publication No. 2016-132221 discloses one example of an inkjet recording apparatus provided with refillable ink tanks. A user injects ink from an ink bottle into an ink chamber through an inlet opening formed in the ink tank. The inkjet recording apparatus in Japanese Patent Application Publication No. 2016-132221 is also configured to prompt the user to indicate whether ink has been supplied into the ink chamber when inferring that an ink chamber was refilled with ink. If the user performs an operation to indicate that the ink chamber was refilled, the inkjet recording apparatus initializes a count value indicative of a residual ink quantity.

SUMMARY

However, with the conventional inkjet recording apparatus described above, there is no guarantee that the user has refilled the ink chamber with ink to its maximum capacity. In other words, it is difficult to deduce with accuracy the actual residual ink quantity based on the count value. Consequently, if a recording section of the inkjet recording apparatus continues to eject ink after an ink level has fallen below an outlet of the ink chamber, air will be introduced into a channel leading from the ink chamber to the recording section (hereinafter referred to as "air introduction"), resulting in adversely affecting image recording quality.

In view of the foregoing, it is an object of the disclosure to provide an inkjet recording apparatus capable of reducing risk of air introduction, even when the inkjet recording apparatus has no means for detecting a residual ink quantity in an ink chamber with accuracy.

In order to attain the above and other objects, according to one aspect, the disclosure provides an inkjet recording apparatus including: a tank; a recording head; a display; and a controller. The tank has an ink chamber configured to store ink therein and formed with an inlet through which the ink is injected into the ink chamber. The tank has an outer wall. The outer wall has at least a portion allowing the ink stored in the ink chamber to be visible from an outside. The recording head is configured to eject the ink stored in the ink chamber to record an image on a sheet. The display is configured to display a screen. The controller is configured to control the recording head and the display. The controller is further configured to: execute a first determination process to determine whether a user is near the inkjet recording apparatus; and execute, after determination in the first determination process that the user is near the inkjet recording apparatus, a notification process to control the display to display a notification screen when the quantity of ink stored in the ink chamber is not less than a residual ink threshold. The notification screen prompts the user to check the quantity of ink stored in the ink chamber.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1A:
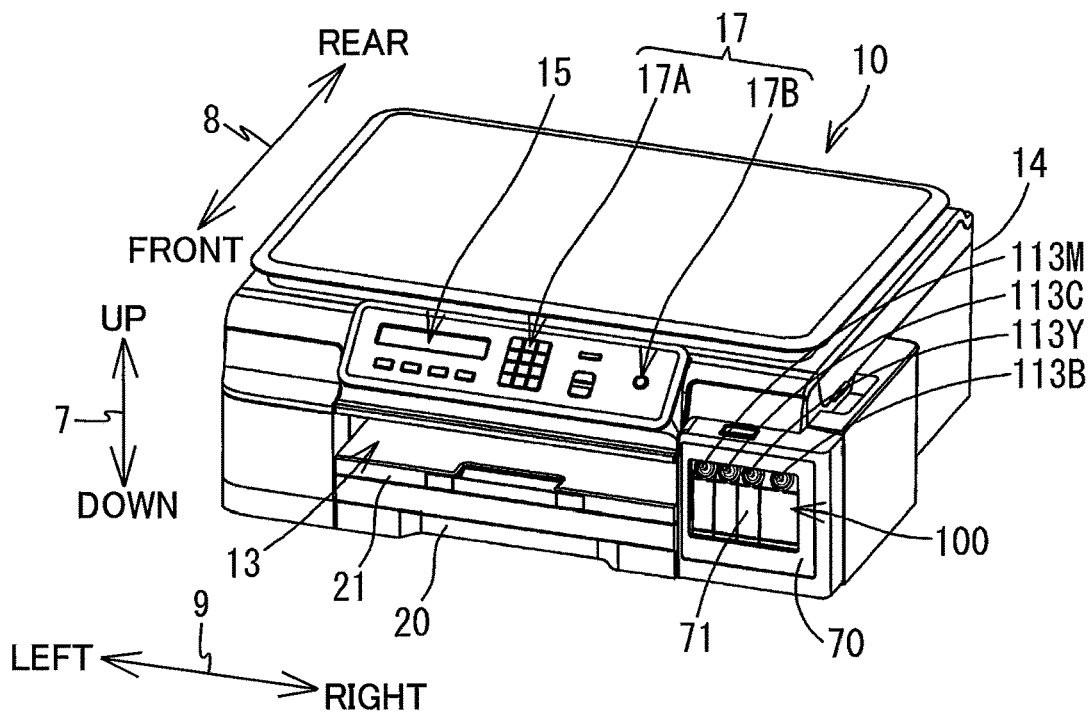
FIG. 1A is a perspective view of a multifunction peripheral (MFP) 10 according to one embodiment of the present disclosure, and illustrating a covering position of a cover 70 of the MFP 10.

Hereinafter, a multifunction peripheral (hereinafter abbreviated as "MFP") 10 according to one embodiment of the present disclosure will be described with reference to FIGS. 1 to 10. It would be apparent that the embodiment described below is merely an example of the disclosure and may be modified in many ways without departing from the scope of the disclosure.

In the following description, an up-down direction 7 is defined based on an orientation of the MFP 10 when the MFP 10 is ready to use (hereinafter referred to as an "operable posture"); a front-rear direction 8 is defined so that a side of the MFP 10 in which a discharge opening 13 is formed is a front side; and a left-right direction 9 is defined based on a perspective of an user facing the front side of the MFP 10.

<Overall Structure of MFP 10>

As illustrated in FIGS. 1A, 1B, 2, and 6, the MFP 10 includes a feed tray 20, a discharge tray 21, a conveying section 23, a recording section 24, and an ink tank 100. The ink tank 100 is an example of a tank. These components of the MFP 10 are accommodated in a casing 14 having a general rectangular parallelepiped shape. The MFP 10 has a printer function for recording images on sheets according to an inkjet recording method. The MFP 10 may also have other functions, such as a facsimile function and a scanning function. The MFP 10 is an example of an inkjet recording apparatus.

<Feed Tray 20 and Discharge Tray 21>

Figure 1B:
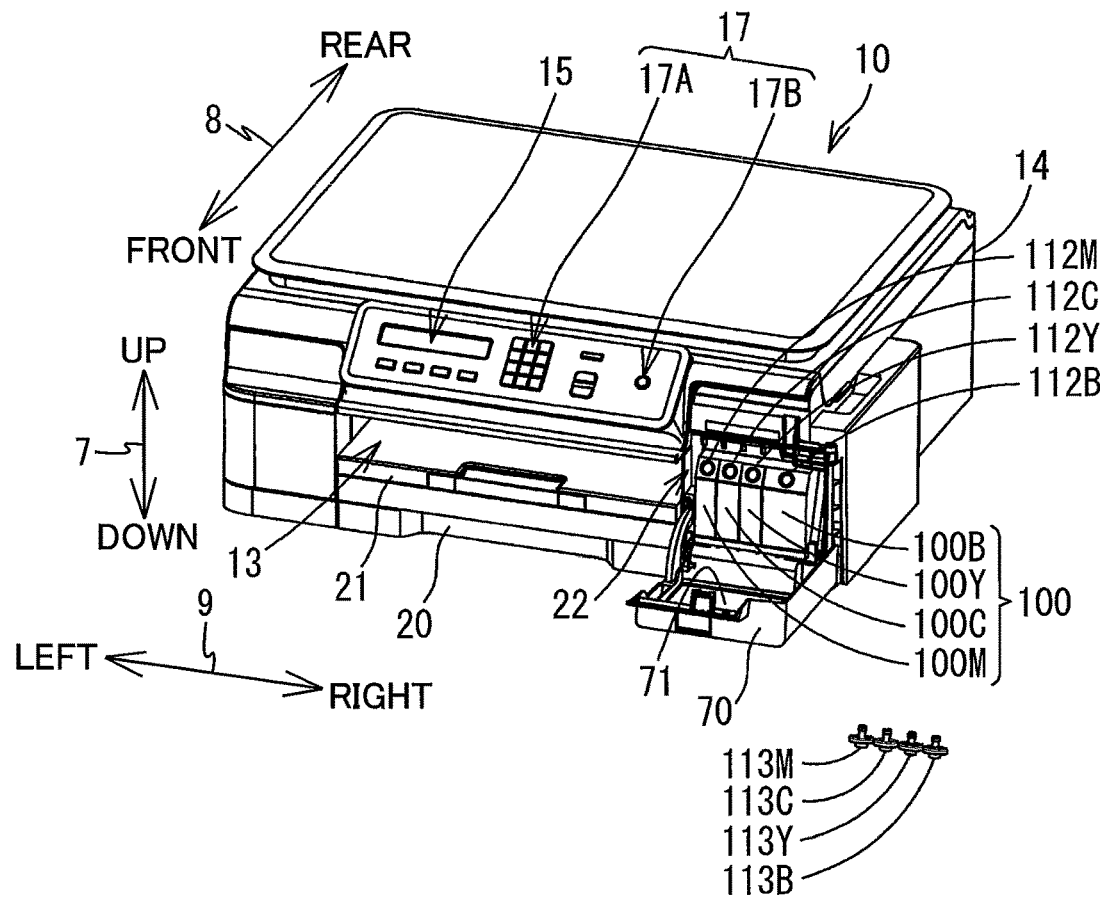
FIG. 1B is a perspective view of the MFP 10 according to the embodiment, and illustrating an exposing position of the cover 70.

As illustrated in FIGS. 1A and 1B, the discharge opening 13 is formed in a front surface of the casing 14 at its center region in the left-right direction 9. The feed tray 20 is inserted into and removed from the casing 14 through the discharge opening 13 in the front-rear direction 8. The feed tray 20 can support a plurality of sheets in a stacked state. The discharge tray 21 is disposed above the feed tray 20. The discharge tray 21 is inserted into and removed from the casing 14 together with the feed tray 20. The discharge tray 21 supports sheets discharged by the conveying section 23.

<Conveying Section 23 and Recording Section 24>

The conveying section 23 is configured to convey the sheets supported on the feed tray 20 along a conveying path that leads to the discharge tray 21 while passing through a position in which the sheets face the recording section 24. The conveying section 23 includes a plurality of rollers and the like that rotate while in contact with the sheets, for example. The recording section 24 is configured to record images on sheets conveyed by the conveying section 23 by ejecting ink stored in the ink tank 100. The recording section 24 includes a carriage that is movable in a main scanning direction crossing a direction in which the sheets are conveyed, and a recording head that is mounted on the carriage and configured to eject ink from nozzles, for example. The recording section 24 is an example of a recording head.

Figure 2:
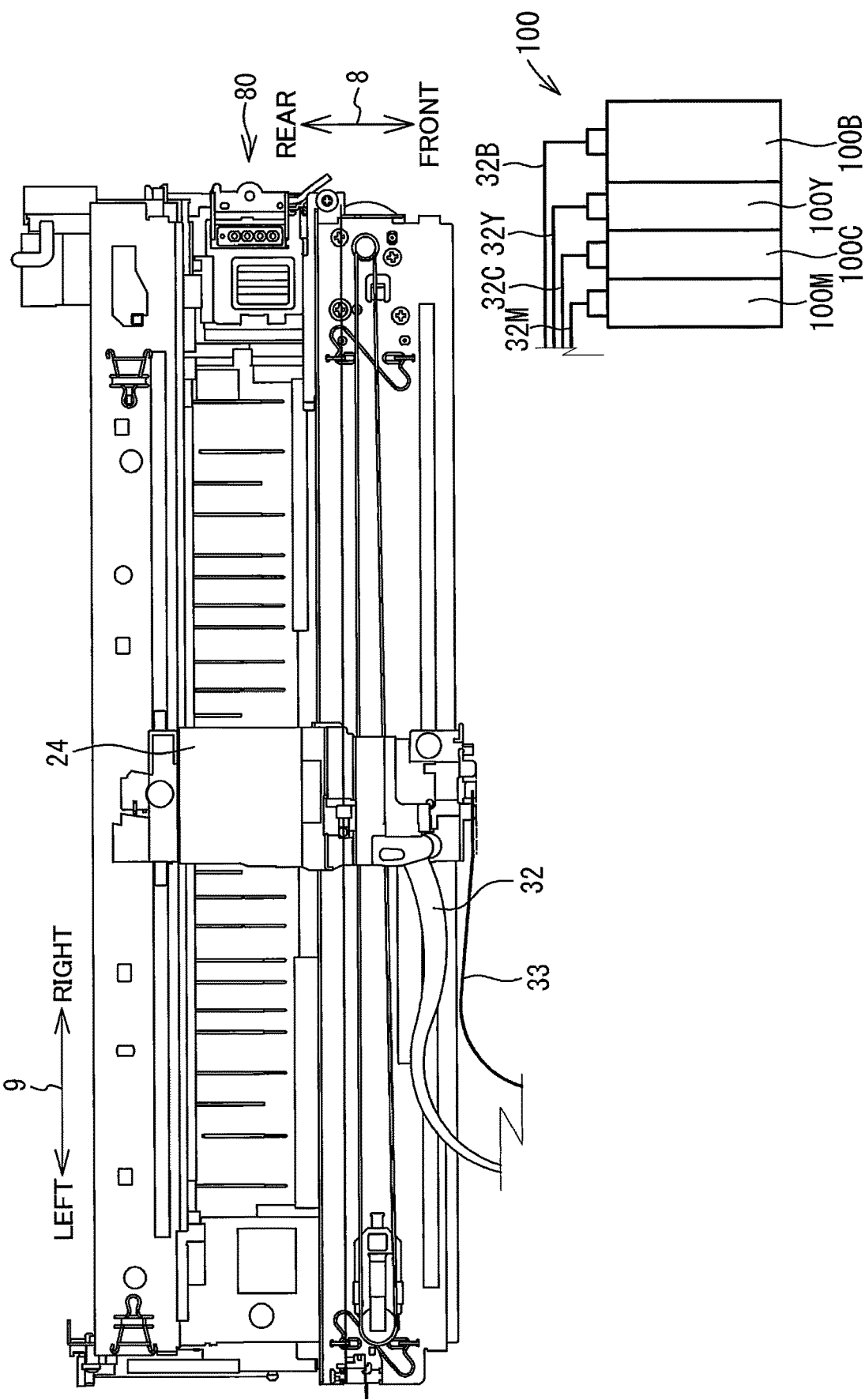
FIG. 2 is a plan view of a recording section 24 and an ink tank 100 in the MFP 10 according to the embodiment.

As illustrated in FIG. 2, ink tubes 32 and a flexible flat cable 33 are connected to the recording section 24. The ink tubes 32 are configured to supply ink stored in the ink tank 100 to the recording section 24. More specifically, the ink tubes 32 include four ink tubes 32B, 32Y, 32C, and 32M (hereinafter collectively referred to as the ink tubes 32) for allowing ink of four colors, i.e., black, magenta, cyan, and yellow, to flow therethrough, respectively. The ink tubes 32 are bundled together, with one end of the ink tubes 32 connected to and extending from the ink tank 100 and the other end connected to the recording section 24. The flexible flat cable 33 is configured to transmit control signals outputted from a controller 130 (see FIG. 6) to the recording section 24.

<Ink Tank 100>

As illustrated in FIGS. 1A and 1B, the ink tank 100 is installed in an interior space of the casing 14 at its right-front portion. That is, the ink tank 100 is fixed in the MFP 10 and cannot easily be removed from the casing 14. Here, the phrase "cannot easily be removed" is intended to mean that a general user cannot simply remove the ink tank 100 from the MFP 10 under normal operating conditions, for example. There is no need to install the ink tank 100 in such a way that makes them impossible to remove from the MFP 10.

The ink tank 100 is configured to store ink to be supplied to the recording section 24. As illustrated in FIG. 1B, the ink tank 100 includes four tanks 100B, 100Y, 100C, and 100M. Each of the tanks 100B, 100Y, 100C, and 100M stores ink of a different color. Specifically, the tank 100B stores black ink, the tank 100Y stores yellow ink, the tank 100C stores cyan ink, and the tank 100M stores magenta ink. However, the number of tanks 100B, 100Y, 100C, and 100M and the colors of ink stored therein are not limited to the above example.

The four tanks 100B, 100Y, 100C, and 100M are disposed in a row along the left-right direction 9. Of the four tanks 100B, 100Y, 100C, and 100M, the tank 100B is disposed farthest to the right while the tank 100M is disposed farthest to the left. The tank 100B has a width in the left-right direction 9 greater than those of the other tanks 100Y, 100C, and 100M. The tank 100B also has an ink chamber 111B (described later) with a capacity greater than those of ink chambers 111Y, 111C, and 111M of the other tanks 100Y, 100C, and 100M. However, arrangement of the tanks 100B, 100Y, 100C, and 100M, sizes of the tanks 100B, 100Y, 100C, and 100M, and capacities of the ink chambers 111 are not limited to the relationships described in the above example.

Figure 3:
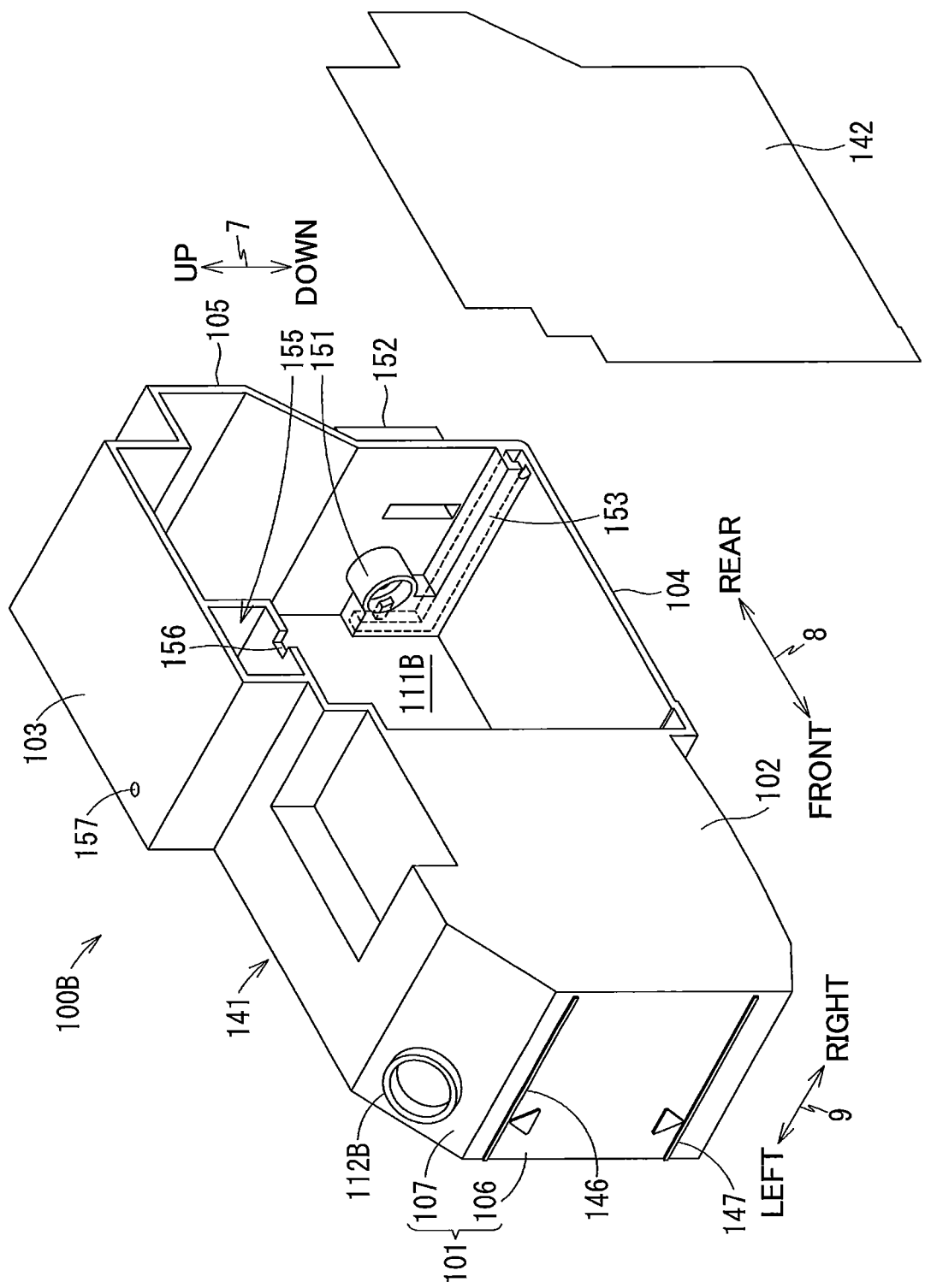
FIG. 3 is a perspective view of a tank 100B in the MFP 10 according to the embodiment as viewed from a front side thereof.
Figure 4:
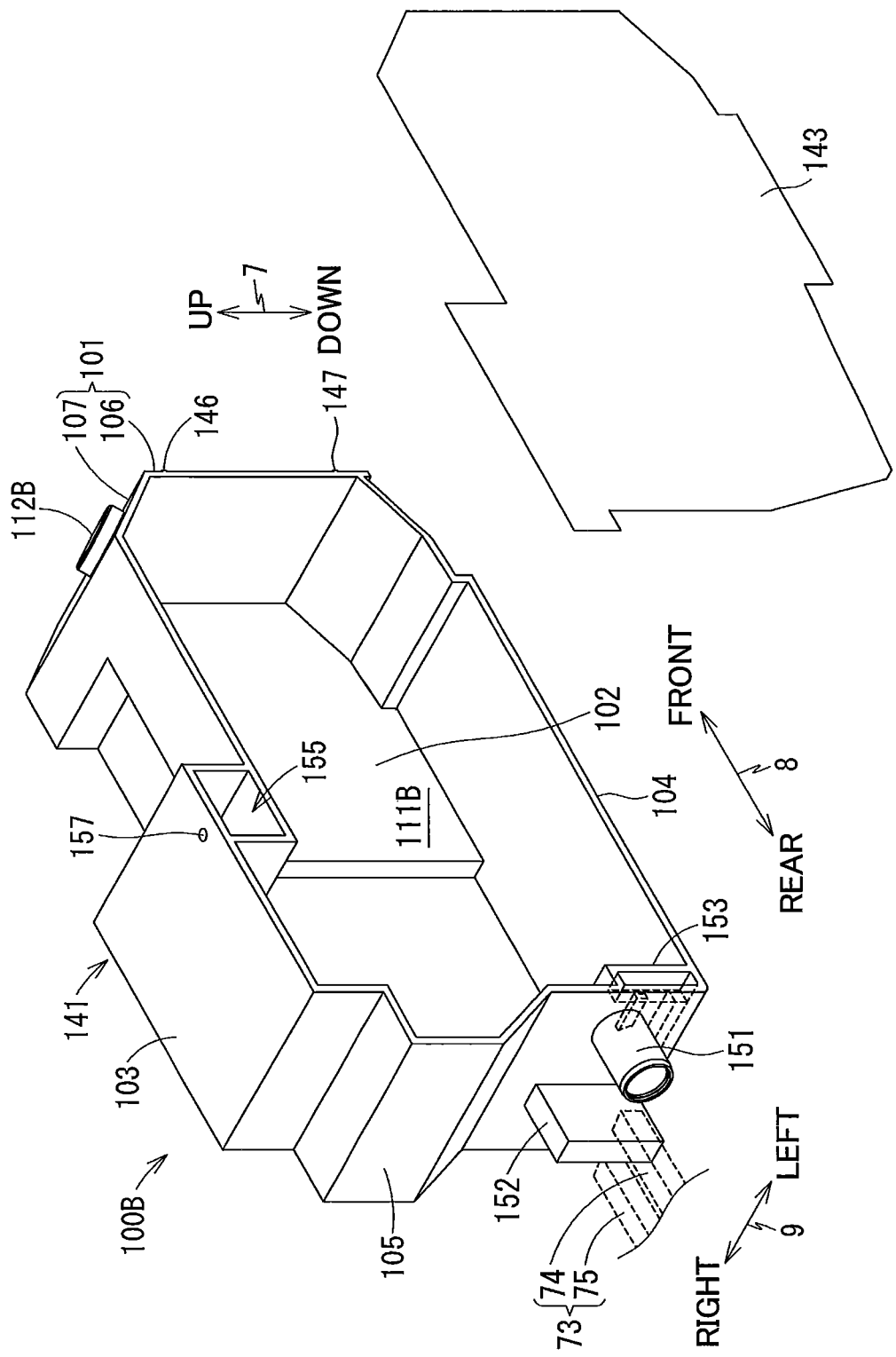
FIG. 4 is a perspective view of the tank 100B as viewed from a rear side thereof.

As illustrated in FIGS. 3 and 4, the tank 100B includes a frame 141, and two films 142 and 143. The frame 141 has a general rectangular parallelepiped shape that is flattened in the left-right direction 9 such that its dimensions in the up-down direction 7 and the front-rear direction 8 are greater than its dimension in the left-right direction 9. The frame 141 is formed of a resin (polypropylene, for example) that is sufficiently translucent to allow visual recognition of ink stored in the ink chamber 111B from outside the tank 100B. The frame 141 may be integrally molded through injection molding of a resin material, for example.

The frame 141 includes a front wall 101, a right wall 102, a top wall 103, a bottom wall 104, and a rear wall 105. A left end and part of a right end of the frame 141 are open. The films 142 and 143 are melt-bonded to the frame 141 so as to seal the openings in the left and right ends of the frame 141. An interior space of the tank 100B defined by the front wall 101, the right wall 102, the top wall 103, the bottom wall 104, the rear wall 105, and the films 142 and 143 constitutes the ink chamber 111B in which the ink is stored. Note that the ink chamber 111B may instead be defined by inner walls (not illustrated) positioned inside the outer walls 101-105 constituting the frame 141. Alternatively, the ink chamber 111B may be divided into a plurality of small regions by partitioning walls (not illustrated).

The front wall 101 is configured of a vertical wall 106, and a sloped wall 107. The vertical wall 106 expands in the up-down direction 7 and the left-right direction 9. The sloped wall 107 is connected between a top edge of the vertical wall 106 and a front edge of the top wall 103. The sloped wall 107 slopes relative to the up-down direction 7 and the front-rear direction 8. An inlet 112B is formed in the sloped wall 107. Ink is injected, or poured, into the ink chamber 111B through the inlet 112B. The inlet 112B penetrates the sloped wall 107 in a thickness direction thereof, allowing the ink chamber 111B to be in communication with an exterior of the tank 100B.

The inlet 112B is closed with a cap 113B. As illustrated in FIG. 1A, the cap 113B attached to the sloped wall 107 intimately contacts a surface of the sloped wall 107 defining a peripheral edge of the inlet 112B to seal the inlet 112B. As illustrated in FIG. 1B, on the other hand, the cap 113B is removed from the sloped wall 107 to open the inlet 112B. Here, the cap 113B can be attached to and removed from the sloped wall 107 while a cover 70 (described later) is in its exposing position. By removing the cap 113B from the inlet 112B, the user can inject ink into the ink chamber 111B through the inlet 112B.

As illustrated in FIGS. 3 and 4, a first line 146 and a second line 147 are provided on an outer surface of the vertical wall 106. The first line 146 and the second line 147 both extend in the left-right direction 9. When the MFP 10 is in its operable posture, the first line 146 is positioned approximately at a height in the up-down direction 7 the same as a level of ink in the ink chamber 111B when the ink chamber 111B stores ink of a preset maximum storage quantity. The maximum storage quantity corresponds to the quantity of ink stored in a single ink bottle (not illustrated), for example. When the MFP 10 is in its operable posture, the second line 147 is positioned lower in the up-down direction 7 than the first line 146 and higher in the up-down direction 7 than a detection position described later.

An ink supply portion 151 is provided at the rear wall 105. The ink supply portion 151 has a cylindrical shape with a hollow interior space. The ink supply portion 151 protrudes rearward from an outer surface of the rear wall 105. A distal end (i.e., protruding end) of the ink supply portion 151 is open to serve as an outlet for allowing the ink to flow out of the ink chamber 111. The interior space of the ink supply portion 151 is in communication with the ink chamber 111B through an ink channel 153 described later. By connecting the ink tube 32B to the ink supply portion 151 so that one end portion of the ink tube 32B covers an outer surface of the ink supply portion 151, ink stored in the ink chamber 111B is supplied to the ink tube 32B through the ink supply portion 151.

An ink detection portion 152 is provided at the rear wall 105. The ink detection portion 152 protrudes rearward from the outer surface of the rear wall 105. The ink detection portion 152 has a box shape with a hollow interior space. The ink detection portion 152 is formed of a light transmissive material that allows transmission of light irradiated from a light-emitting portion 74 described later. The interior space of the ink detection portion 152 is in communication with the ink chamber 111B. Hence, ink is present in the interior space of the ink detection portion 152 when the level of ink in the ink chamber 111B is higher than a lower edge of the ink detection portion 152. On the other hand, ink is not present in the interior space of the ink detection portion 152 when the level of ink in the ink chamber 111B is lower than the lower edge of the ink detection portion 152.

The ink channel 153 is a long narrow path for supplying ink stored in the ink chamber 111B to the ink supply portion 151. The ink channel 153 has one end that communicates with the ink chamber 111B at a position in contact with an inner surface of the bottom wall 104, and another end that communicates with the interior space of the ink supply portion 151. More specifically, the ink channel 153 extends leftward from its communicating position with the ink chamber 111B, and then extends upward at the left end of the tank 100B, and lastly extends rightward from a position of height equal to the ink supply portion 151 to communicate with the interior space of the ink supply portion 151.

An air communication portion 155 is also provided in the tank 100B. The air communication portion 155 is an air passage that allows the ink chamber 111B to communicate with external air. The air communication portion 155 is provided at a position upward relative to the inlet 112B in the up-down direction 7. The air communication portion 155 has one end that communicates with the ink chamber 111B through a notch 156 formed in a bottom wall of the air communication portion 155, and another end that communicates with an exterior of the tank 100B through a through-hole 157 penetrating the top wall 103. A labyrinth channel, a semipermeable membrane, or the like may be provided inside the air communication portion 155.

<Residual Ink Sensor 73>

Figure 6:
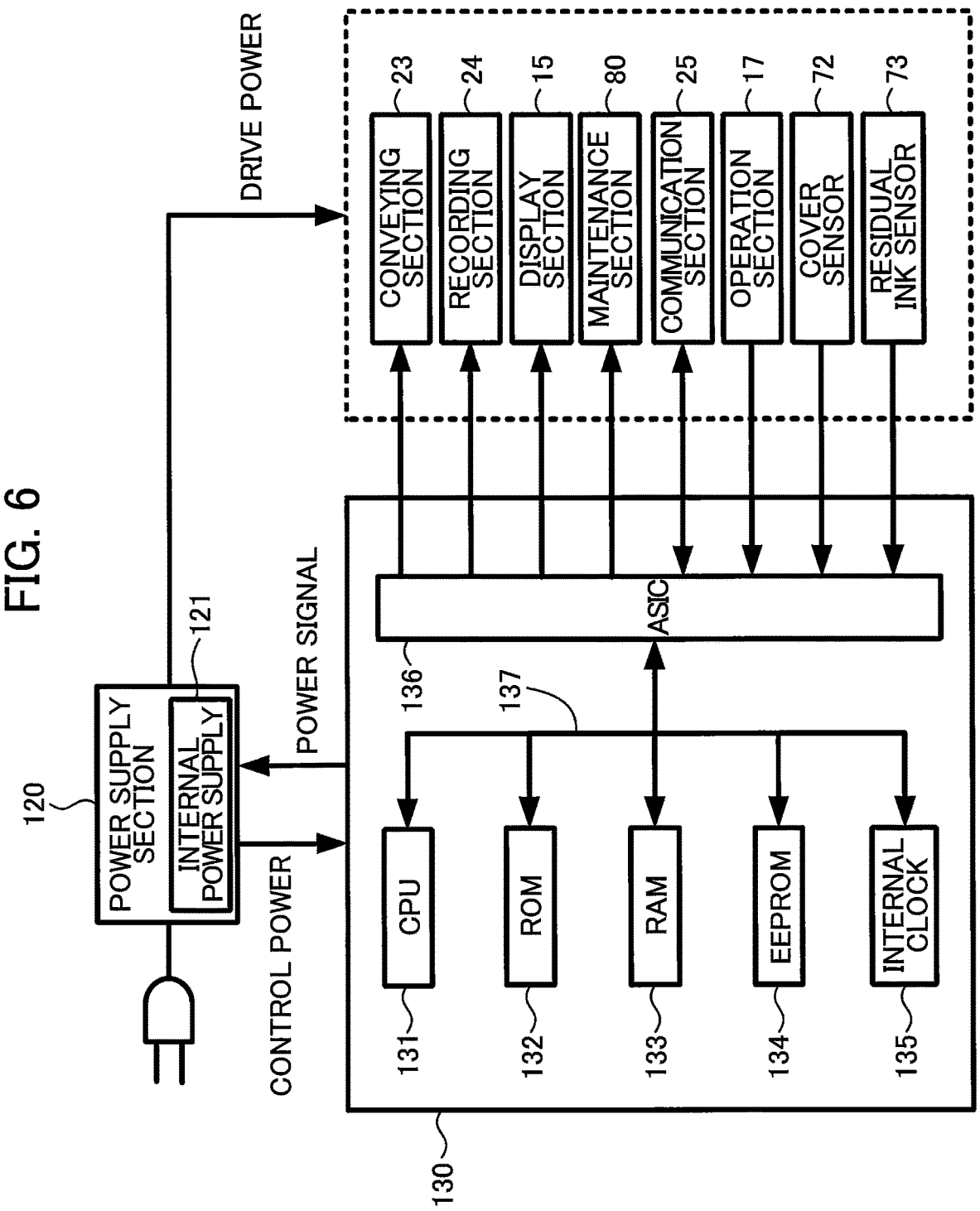
FIG. 6 is a functional block diagram of the MFP 10 according to the embodiment.

As illustrated in FIGS. 4 and 6, the MFP 10 also includes a residual ink sensor 73. The residual ink sensor 73 has the light-emitting portion 74 and a light-receiving portion 75. The light-emitting portion 74 and the light-receiving portion 75 are arranged to oppose each other in the left-right direction 9 with the ink detection portion 152 interposed therebetween. The light-emitting portion 74 is configured to output light (visible light or infrared light, for example) toward the light-receiving portion 75. The light can pass through walls constituting the ink detection portion 152 but not through black ink. The light-receiving portion 75 is configured to output a residual ink signal to the controller 130 based on whether the light-receiving portion 75 has received light outputted from the light-emitting portion 74 after the light passes through the ink detection portion 152. In other words, the residual ink sensor 73 is configured to output a residual ink signal to the controller 130 corresponding to the quantity of ink stored in the ink chamber 111B.

The residual ink sensor 73 according to the present embodiment is configured to output either a first residual ink signal or a second residual ink signal to the controller 130. The residual ink sensor 73 outputs the first residual ink signal in response to presence of ink at the detection position in the ink detection portion 152. On the other hand, the residual ink sensor 73 outputs the second residual ink signal in response to non-presence of ink at the detection position in the ink detection portion 152. In the present embodiment, the first residual ink signal outputted from the residual ink sensor 73 has a signal level of 0 V, while the second residual ink signal outputted from the residual ink sensor 73 has a signal level of 3.3 V. Hence, the phrase "the residual ink sensor 73 outputs a residual ink signal" includes cases in which the signal level is 0 V. However, combination of signal levels is not limited to the above example. Combination of position signals of a cover sensor 72 (described later) is also not limited to the example in the present embodiment.

The detection position is a position within the interior space of the ink detection portion 152 having a height in the up-down direction 7 the same as those of the light-emitting portion 74 and the light-receiving portion 75. The detection position in the up-down direction 7 is lower than the second line 147 and slightly higher than the interior space of the ink supply portion 151 when the MFP 10 is in its operable posture. Hence, the interior space of the ink supply portion 151 is filled with ink when the level of ink in the ink chamber 111B is aligned with the detection position. However, when the level of ink in the ink chamber 111B drops below the detection position, air introduced into the ink chamber 111B through the air communication portion 155 may enter the interior space of the ink supply portion 151. A difference in the up-down direction 7 between the detection position and the interior space in the ink supply portion 151 is preliminarily set based on an estimated quantity of ink required for recording an image on one sheet, for example.

Hence, the residual ink signal outputted from the residual ink sensor 73 switches from the first residual ink signal to the second residual ink signal at a timing in which the level of ink in the ink chamber 111B drops below the detection position. In the following description, a state of the ink chamber 111B when the residual ink sensor 73 outputs the second residual ink signal will be referred to as a "hard-empty" state. In other words, the term "hard-empty state" indicates a state of the ink chamber 111B just prior to air entering the interior space of the ink supply portion 151, for example. The hard-empty state is an example of the quantity of ink stored in the ink chamber 111B being less than a residual ink threshold. The residual ink threshold corresponds to the quantity of ink stored in the ink chamber 111B when the level of ink in the ink chamber 111B is at the detection position, for example.

Each of the tanks 100Y, 100C, and 100M may have a basic structure the same as that of the tank 100B. However, the tanks 100Y, 100C, and 100M are not provided with the ink detection portion 152. That is, the controller 130 cannot detect residual ink quantities in the corresponding ink chambers 111Y, 111C, and 111M using residual ink sensors 73. Hereinafter, the ink chambers 111B, 111Y, 111C, and 111M will be collectively referred to as the "ink chambers 111," the inlets 112B, 112Y, 112C, and 112M will be collectively referred to as the "inlets 112," and the caps 113B, 113Y, 113C, and 113M will be collectively referred to as the "caps 113."

<Cover 70>

As illustrated in FIG. 1B, the front surface of the casing 14 has a right end portion formed with an opening 22. The front surface of the ink tank 100 is exposed to an outside of the MFP 10 through the opening 22. The MFP 10 has the cover 70 that is pivotally movable between a covering position (a position illustrated in FIG. 1A) for covering the opening 22, and an exposing position (a position illustrated in FIG. 1B) for exposing the opening 22. The cover 70 is supported to the casing 14 at a bottom edge portion of the casing 14 so as to be pivotally movable about a pivot axis extending along the left-right direction 9.

In the covering position, the cover 70 covers all of the inlets 112B, 112Y, 112C, and 112M and restricts injection of ink into all of the ink chambers 111B, 111Y, 111C, and 111M through the inlets 112B, 112Y, 112C, and 112M. Here, the cover 70 in the covering position may be configured to cover the inlets 112 in their entirety or to cover just a portion of the inlets 112. When the cover 70 is in the exposing position, all of the inlets 112B, 112Y, 112C, and 112M are exposed outside the MFP 10, thereby allowing ink to be injected into all of the ink chambers 111B, 111Y, 111C, and 111M.

The user performs the following series of steps for filling the ink chambers 111 with ink. First, the user moves the cover 70 from the covering position to the exposing position and removes the cap 113 from the inlet 112 corresponding to the color of ink to be refilled. Next, the user inserts a tip of the ink bottle into the opened inlet 112 and injects all of ink in the ink bottle into the ink chamber 111. After the ink chamber 111 has been refilled, the user reattaches the cap 113 to the corresponding inlet 112 and moves the cover 70 back to the covering position.

The cover 70 has a transparent window 71. The transparent window 71 faces the front walls 101 of the tanks 100B, 100Y, 100C, and 100M when the cover 70 is in the covering position. With this configuration, the user can visually recognize the residual ink quantity of ink in the ink chambers 111 through the front walls 101, regardless of whether the cover 70 is in the covering position or the exposing position. On the other hand, the transparent window 71 may be omitted from the cover 70. In this case, the user must move the cover 70 to the exposing position in order to check the levels of ink in the ink chambers 111.

<Cover Sensor 72>

As illustrated in FIG. 6, the MFP 10 also includes the cover sensor 72. The cover sensor 72 may be a mechanical sensor, such as a switch that the cover 70 contacts and separates from, or an optical sensor for emitting light that is transmitted or interrupted depending on the position of the cover 70, for example. The cover sensor 72 is configured to output, to the controller 130, a position signal corresponding to the position of the cover 70.

The cover sensor 72 is configured to output either a first position signal or a second position signal to the controller 130. The first position signal outputted from the cover sensor 72 indicates that the cover 70 is in the covering position. The second position signal outputted from the cover sensor 72 indicates that the cover 70 is in a position other than the covering position (the exposing position, for example). In the present embodiment, the first position signal outputted from the cover sensor 72 has a signal level of 0 V, and the second position signal outputted from the cover sensor 72 has a signal level of 3.3. V. In the following description, an expression "cover open event" will be used to indicate that the position signal outputted from the cover sensor 72 has changed from the first position signal to the second position signal, while an expression "cover close event" will be used to indicate that the position signal outputted from the cover sensor 72 has changed from the second position signal to the first position signal.

<Maintenance Section 80>

Figure 5:
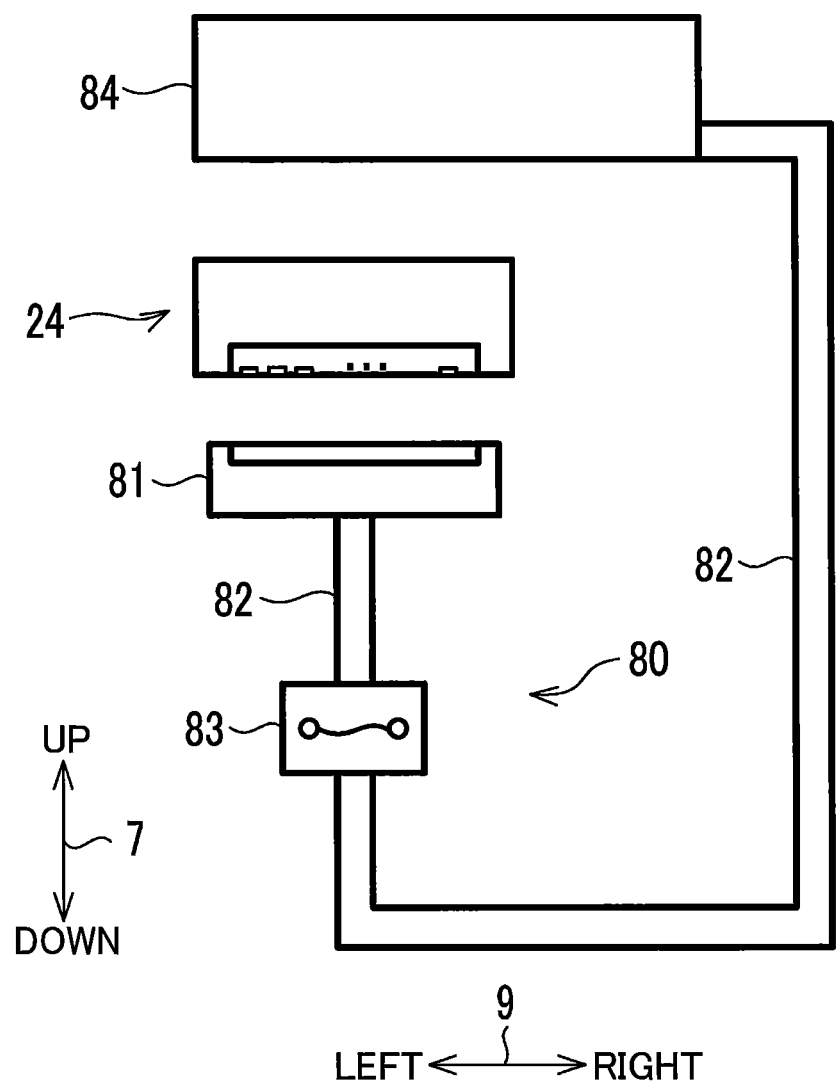
FIG. 5 is a schematic diagram illustrating a configuration of a maintenance section 80 in the MFP 10 according to the embodiment.

As illustrated in FIGS. 2, 5, and 6, the MFP 10 also includes a maintenance section 80 configured to perform maintenance of the recording section 24. More specifically, the maintenance section 80 causes the nozzles in the recording head to forcibly discharge ink, air, and foreign matter in order to avoid a decline in recording quality in a recording process described later. As illustrated in FIG. 5, the maintenance section 80 includes a cap 81, a tube 82, a pump 83, and a waste ink tank 84.

The cap 81 is capable of contacting and separating from the recording head of the recording section 24. When in intimate contact with the recording head, the cap 81 covers the nozzles formed in the recording head. The tube 82 is a passage that connects from the cap 81 to the waste ink tank 84 while passing through the pump 83. The pump 83 is a rotary pump, for example, that draws ink and the like out of the nozzles and removes the same through the cap 81 and the tube 82. The ink and the like removed by the pump 83 are collected in the waste ink tank 84. Note that the specific structure of the maintenance section 80 is not limited to the above example. For example, the maintenance section 80 may cause the nozzles to forcibly discharge ink and the like by pressurizing the nozzles in the recording section 24.

The controller 130 repeatedly executes a maintenance process at prescribed intervals using the maintenance section 80. Specifically, the controller 130 executes the maintenance process each time a prescribed time interval elapses since the maintenance process was previously executed or when a user operation instructing the execution of the maintenance process is received through an operation section 17 (described later). In the maintenance process, the controller 130 moves the carriage supporting the recording head to a position in which the recording head opposes the cap 81, moves the cap 81 to cover the nozzles in the recording section 24, and drives the pump 83 to force the nozzle to discharge the ink.

<Display Section 15>

As illustrated in FIGS. 1A, 1B and 6, the MFP 10 also includes a display section 15. The display section 15 displays information for the user in the form of messages. While there are no particular limitations on the specific structure of the display section 15, a liquid crystal display or an organic electro-luminescence display may be employed as the display section 15, for example. The display section 15 is an example of a display.

The display section 15 according to the present embodiment has a rectangular shape with 8 dots vertically by 80 dots horizontally. Thus, the display section 15 can display a maximum of 16 characters (including spaces), each comprising 8 dots vertically by 5 dots horizontally (approximately 8 mm vertically by approximately 5 mm horizontally). Further, when attempting to display a character string exceeding 16 characters on the display section 15, the character string is displayed in a scrolling format. When attempting to display character strings in a plurality of lines on the display section 15, the character string for each line is displayed in sequence. However, the size of the display section 15 is not limited to the above example.

<Operation Section 17>

The MFP 10 also includes the operation section 17 for receiving user operations. The operation section 17 is an input interface that accepts input from a user indicating instructions for the MFP 10. The operation section 17 according to the present embodiment is configured of a plurality of push buttons, including a numeric keypad 17A and a power button 17B. However, the push buttons provided in the operation section 17 are not limited to the above example, and may include directional keys corresponding to "up", "down", "right", and "left". Further, the specific configuration of the operation section 17 is not limited to the push buttons, but may be a touchscreen superimposed over the display screen of the display section 15. The operation section 17 is an example of an operation interface.

The operation section 17 is configured to output, to the controller 130, operation signals corresponding to the push buttons that have been pressed. Specifically, the operation section 17 according to the present embodiment is configured to output a first operation signal, a second operation signal, a third operation signal, and a fourth operation signal to the controller 130. The operation section 17 outputs the first operation signal to the controller 130 when the [1] button in the numeric keypad 17A has been pressed. The operation section 17 outputs the second operation signal to the controller 130 when the [2] button in the numeric keypad 17A has been pressed. The operation section 17 outputs the third operation signal to the controller 130 when the [9] button in the numeric keypad 17A has been pressed. The operation section 17 outputs the fourth operation signal to the controller 130 when the power button 17B has been pressed. The operation section 17 also outputs, to the controller 130, other operation signals corresponding to other buttons when the other buttons are pressed.

In the following description, an expression "the [1] button was pressed" will indicate that the operation section 17 outputted the first operation signal, an expression "the [2] button was pressed" will indicate that the operation section 17 outputted the second operation signal, an expression "the [9] button was pressed" will indicate that the operation section 17 outputted the third operation signal, and an expression "the power button 17B was pressed" will indicate that the operation section 17 outputted the fourth operation signal. Note that the buttons corresponding to the first operation signal, the second operation signal, the third operation signal, and the fourth operation signal are not limited to the above example.

<Communication Section 25>

As illustrated in FIG. 6, the MFP 10 also includes a communication section 25. The communication section 25 is an interface through which the MFP 10 communicates with external devices. In other words, the MFP 10 is configured to transmit various data to external devices through the communication section 25 and to receive various data from external devices through the communication section 25. The communication section 25 may also function as a facsimile receiving section that receives facsimile data from external devices. While the specific configuration of the communication section 25 is not particularly limited, the communication section 25 may be a LAN interface for connecting the MFP 10 to the Internet through a wired LAN or a wireless LAN as examples of a communication network, or may be a USB interface into which a USB cable is inserted and from which the USB cable is removed.

<Power Supply Section 120>

The MFP 10 also includes a power supply section 120. The power supply section 120 is configured to receive electric power from an external power source when the MFP 10 is plugged into the external power source, and to supply this electric power to various components in the MFP 10. More specifically, through the electric power acquired from the external power source, the power supply section 120 outputs drive power (24 V, for example) to the conveying section 23, the recording section 24, and the like and outputs control power (5 V, for example) to the controller 130. The power supply section 120 includes an internal power supply 121. The power supply section 120 charges the internal power supply 121 with part of the electric power supplied from the external power source in a state where the power supply section 120 is in a plug ON state (described later).

The power supply section 120 can switch between the plug ON state and a plug OFF state. In the plug ON state, the MFP 10 is plugged into the external power source, and the MFP 10 receives electric power from the external power source through the plug. In the plug OFF state, the MFP 10 is unplugged, and the power supply section 120 does not receive electric power from the external power source. Hence, the power supply section 120 charges the internal power supply 121 with some of the electric power supplied from the external power source during the plug ON state, but does not charge the internal power supply 121 during the plug OFF state.

The power supply section 120 in the plug ON state can switch between a switch ON state and a switch OFF state based on a power signal outputted from the controller 130. When the power supply section 120 is in the switch OFF state, the controller 130 switches the power supply section 120 to the switch ON state in response to pressing of the power button 17B. Similarly, when the power supply section 120 is in the switch ON state, the controller 130 switches the power supply section 120 to the switch OFF state in response to pressing of the power button 17B.

In the switch OFF state, the power supply section 120 still supplies electric power to the controller 130 and the operation section 17, but does not supply electric power to the conveying section 23, the recording section 24, the display section 15, the maintenance section 80, and the communication section 25. In other words, the controller 130 and the operation section 17 can still operate during the switch OFF state, but the conveying section 23, the recording section 24, the display section 15, the maintenance section 80, and the communication section 25 are inoperable during the switch OFF state. In the switch OFF state, electric power may or may not be supplied to the cover sensor 72 and the residual ink sensor 73. During the switch ON state, electric power is supplied to the greater number of components of the MFP 10 than during the switch OFF state.

During the switch ON state, the power supply section 120 can switch between a drive state and an idle state based on a power signal outputted from the controller 130. The controller 130 switches the power supply section 120 from the idle state to the drive state when an operation is performed on the operation section 17 or when the controller 130 receives information through the communication section 25. The controller 130 switches the power supply section 120 from the drive state to the idle state when the operation section 17 has not been operated and the controller 130 has not received information through the communication section 25 for a prescribed time interval.

In the drive state, the power supply section 120 supplies electric power to all of the components in the MFP 10. In other words, all of the components in the MFP 10 are operable in the drive state. In the idle state, the power supply section 120 supplies electric power to the controller 130, the operation section 17, the communication section 25, the cover sensor 72, and the residual ink sensor 73, but does not supply electric power to the display section 15, the conveying section 23, the recording section 24, and the maintenance section 80. Hence, the controller 130, the operation section 17, the communication section 25, the cover sensor 72, and the residual ink sensor 73 are operable in the idle state, but the display section 15, the conveying section 23, the recording section 24, and the maintenance section 80 are inoperable in the idle state.

<Controller 130>

As illustrated in FIG. 6, the controller 130 includes a central processing unit (CPU) 131, a read-only memory (ROM) 132, a random-access memory (RAM) 133, an electrically erasable programmable ROM (EEPROM) 134, and an application-specific integrated circuit (ASIC) 136. The CPU 131, the ROM 132, the RAM 133, the EEPROM 134, and the ASIC 136 are interconnected with one another via an internal bus 137. The ROM 132 stores programs and the like with which the CPU 131 controls various operations. The RAM 133 is used as a storage area for temporarily storing data, signals, and the like used when the CPU 131 executes the above programs, or as a work area for data processes. The EEPROM 134 stores settings, flags, and the like that must be preserved even during the plug OFF state. The ROM 132, the RAM 133, and the EEPROM 134 are examples of a memory.

The EEPROM 134 stores a count value for each of the ink chambers 111B, 111Y, 111C, and 111M. The count value in the present embodiment is set to an initial value (0, for example) in S46 (described later) and is incremented in S16 (described later) based on the quantity of ink ejected from the recording section 24. In the following description, the count value for the ink chamber 111B will be referred to as the "count value B," the count value for the ink chamber 111Y will be referred to as the "count value Y," the count value for the ink chamber 111C will be referred to as the "count value C," and the count value for the ink chamber 111M will be referred to as the "count value M."

The EEPROM 134 also stores a first threshold value and a second threshold value for each of the ink chambers 111B, 111Y, 111C, and 111M. The first threshold value is set to a slightly smaller value (95, for example) than the maximum storage quantity (100, for example) of ink that can be stored in the corresponding ink chamber 111, for example. A difference between the maximum storage quantity and the first threshold value for the ink chamber 111B is equivalent to the residual ink threshold, for example. The second threshold value is set to a value (85, for example) closer to the initial value of the count value than the first threshold value is to the initial value. A difference between the maximum storage quantity and the second threshold value is equivalent to the quantity of ink stored in the corresponding ink chamber 111 when the level of ink in the ink chamber 111 is aligned with the second line 147, for example.

In the following description, a state of the ink chamber 111 when the difference between the first threshold value and the corresponding count value (first threshold value−count value) is less than 0 will be referred to as a "soft-empty" state. Further, a state of the ink chamber 111 when the difference between the second threshold value and the corresponding count value (second threshold value−count value) is less than 0 will be referred to as an "ink low" state. Hence, the ink chamber 111 arrives at the ink low state prior to the soft-empty state. Ideally or theoretically, a timing at which the ink chamber 111 reaches the soft-empty state is equivalent to a timing at which the ink chamber 111 reaches the hard-empty state. The difference between the first threshold value and the count value and the difference between the second threshold value and the count value may be used as estimation values of the quantity of ink remaining in the corresponding ink chamber 111. The soft-empty state is an example of the quantity of ink stored in the ink chamber 111 being less than the residual ink threshold.

Note that the count value, the first threshold value, and the second threshold value are not limited to the relationships described above. As an alternative example, the count value may be set to an initial value (100, for example) in S46, and may be decremented in S16 based on the quantity of ink ejected from the recording section 24. Here, the first threshold value may be set to a smaller value (5, for example) than the second threshold value (15, for example). In this variation, the soft-empty state is determined based on (count value−first threshold value), and the ink low state is determined based on (count value−second threshold value).

In other words, the count value should be updated in S16 in a direction approaching the first threshold value. Here, the expression "a direction approaching the first threshold value" represents the relationship between the count value and the first threshold value when the count value has been set to its initial value. That is, an incremented count value is continuously incremented, even after reaching the first threshold value. Similarly, a decremented count value is continuously decremented, even after reaching the first threshold value. Further, the second threshold value should be set to a value at which its difference with the count value reaches 0 before the difference between the count value and the first threshold value reaches 0.

The EEPROM 134 also stores a soft-empty flag and an ink low flag for each of the ink chambers 111B, 111Y, 111C, and 111M. The soft-empty flag is information indicating whether the corresponding ink chamber 111 is in the soft-empty state. The soft-empty flag is set to either a value "ON" corresponding to the soft-empty state or a value "OFF" corresponding to a non-soft-empty state. The ink low flag is information indicating whether the corresponding ink chamber 111 is in the ink low state. The ink low flag is set to either a value "ON" corresponding to the ink low state or a value "OFF" corresponding to a non-ink-low state.

The soft-empty flag according to the present embodiment is set to "ON" when the difference between the first threshold value and the corresponding count value is less than 0 in S16, and is set to "OFF" in S46, for example. The ink low flag according to the present embodiment is set to "ON" when the difference between the second threshold value and the corresponding count value is less than 0 in S16, and is set to "OFF" in S46, for example. The initial value of the soft-empty flag and the initial value of the ink low flag are both "OFF".

The EEPROM 134 also stores a hard-empty flag. The hard-empty flag is information indicating whether the ink chamber 111B has entered the hard-empty state the last time ink was ejected from the recording section 24. The hard-empty flag is set to either a value "ON" corresponding to the hard-empty state or a value "OFF" corresponding to a non-hard-empty state. The hard-empty flag according to the present embodiment is set to "ON" during image recording in S15 described later when the residual ink signal outputted from the residual ink sensor 73 switches from the first residual ink signal to the second residual ink signal, and is set to "OFF" in S46, for example. The initial value of the hard-empty flag is "OFF".

In the following description, the soft-empty flag and the ink low flag corresponding to the ink chamber 111B will be referred to as the "soft-empty flag B" and the "ink low flag B," respectively; the soft-empty flag and the ink low flag corresponding to the ink chamber 111Y will be referred to as the "soft-empty flag Y" and the "ink low flag Y," respectively; the soft-empty flag and the ink low flag corresponding to the ink chamber 111C will be referred to as the "soft-empty flag C" and the "ink low flag C," respectively; the soft-empty flag and the ink low flag corresponding to the ink chamber 111M will be referred to as the "soft-empty flag M" and the "ink low flag M," respectively. The hard-empty flag indicates the state of the ink chamber 111B, since the residual ink sensor 73 and the ink detection portion 152 are only provided for the tank 100B in the present embodiment. Hence, the soft-empty flag B may be omitted in this case.

The EEPROM 134 also stores a preceding count value for each of the ink chambers 111B, 111Y, 111C, and 111M. The preceding count values in the present embodiment are set to an initial value (0, for example) in S46, and are overwritten with the corresponding count values in S34, S37, and S59 (described later). In the following description, the preceding count value corresponding to the ink chamber 111B will be referred to as the "preceding count value B"; the preceding count value corresponding to the ink chamber 111Y is will be referred to as the "preceding count value Y"; the preceding count value corresponding to the ink chamber 111C will be referred to as the "preceding count value C"; and the preceding count value corresponding to the ink chamber 111M will be referred to as the "preceding count value M."

The difference between the count value and the corresponding preceding count value (count value–preceding count value) indicates the amount of change in the quantity of ink stored in the corresponding ink chamber 111 (hereinafter referred to as the "change in ink quantity"). The base point for tracking change in ink quantity (i.e., a timing at which the preceding count values are updated or initialized) corresponds to a timing at which the cover 70 is opened and then closed (i.e., when the cover 70 is moved from the exposing position to the covering position; S34 and S37), a timing at which the user inputs, through the operation section 17, an operation indicating that the ink chamber 111 was refilled (S46), and a timing at which the user confirms ink volumes when a residual ink confirmation screen (described later) is displayed on the display section 15 (S59), for example.

The EEPROM 134 also stores a confirmation flag. The confirmation flag is information indicating whether the user indicated confirmation in the residual ink confirmation screen. The confirmation flag is set to either the value "ON" (the first value) when the user has indicated confirmation in the residual ink confirmation screen or the value "OFF" (the second value) when the user has not indicated confirmation. The initial value of the confirmation flag is "OFF". The confirmation flag may be stored in the RAM 133.

The EEPROM 134 also stores a notification flag. The notification flag is information indicating whether a notification process (the process in S54 described later) is in progress. The notification flag is set to either "ON" (the third value) when the notification process is in progress, or "OFF" (the fourth value) when the notification process is not in progress. The initial value of the notification flag is "OFF". The notification flag may be stored in the RAM 133.

Further, the conveying section 23, the recording section 24, the display section 15, the maintenance section 80, the communication section 25, the operation section 17, the cover sensor 72, and the residual ink sensor 73 are connected to the ASIC 136. The controller 130 controls the conveying section 23 to convey sheets, controls the recording section 24 to eject ink, controls the display section 15 to display screens, controls the maintenance section 80 to perform maintenance of the recording section 24, and controls the communication section 25 to communicate with external devices. Further, the controller 130 acquires operation signals from the operation section 17, acquires position signals from the cover sensor 72, and acquires residual ink signals from the residual ink sensor 73. As an example, the controller 130 may read the position signal outputted from the cover sensor 72 and the residual ink signal outputted from the residual ink sensor 73 at prescribed time intervals (every 50 msec, for example).

The controller 130 also includes an internal clock 135 (otherwise known as a hardware clock) that outputs time information. The internal clock 135 is updated by electric power supplied from the external power source through the power supply section 120 when the power supply section 120 is in the plug ON state (i.e., in any of the switch OFF state, the switch ON state, the idle state, and the drive state). When the power supply section 120 is in the plug OFF state, on the other hand, the internal clock 135 is updated by electric power supplied from the internal power supply 121. When the charge in the internal power supply 121 is depleted, the time information outputted from the internal clock 135 is reset to an initial value (a null value, for example).

<Operation of MFP 10>

Next, operations of the MFP 10 according to the present embodiment will be described with reference to FIGS. 7 through 10. The CPU 131 of the controller 130 executes all processes described in FIGS. 7 through 10. Note that, to implement the following processes, the CPU 131 may read and execute a program stored in the ROM 132. Alternatively, the following processes may be implemented by hardware circuits mounted in the controller 130.

<Image Recording Process>

Figure 7:
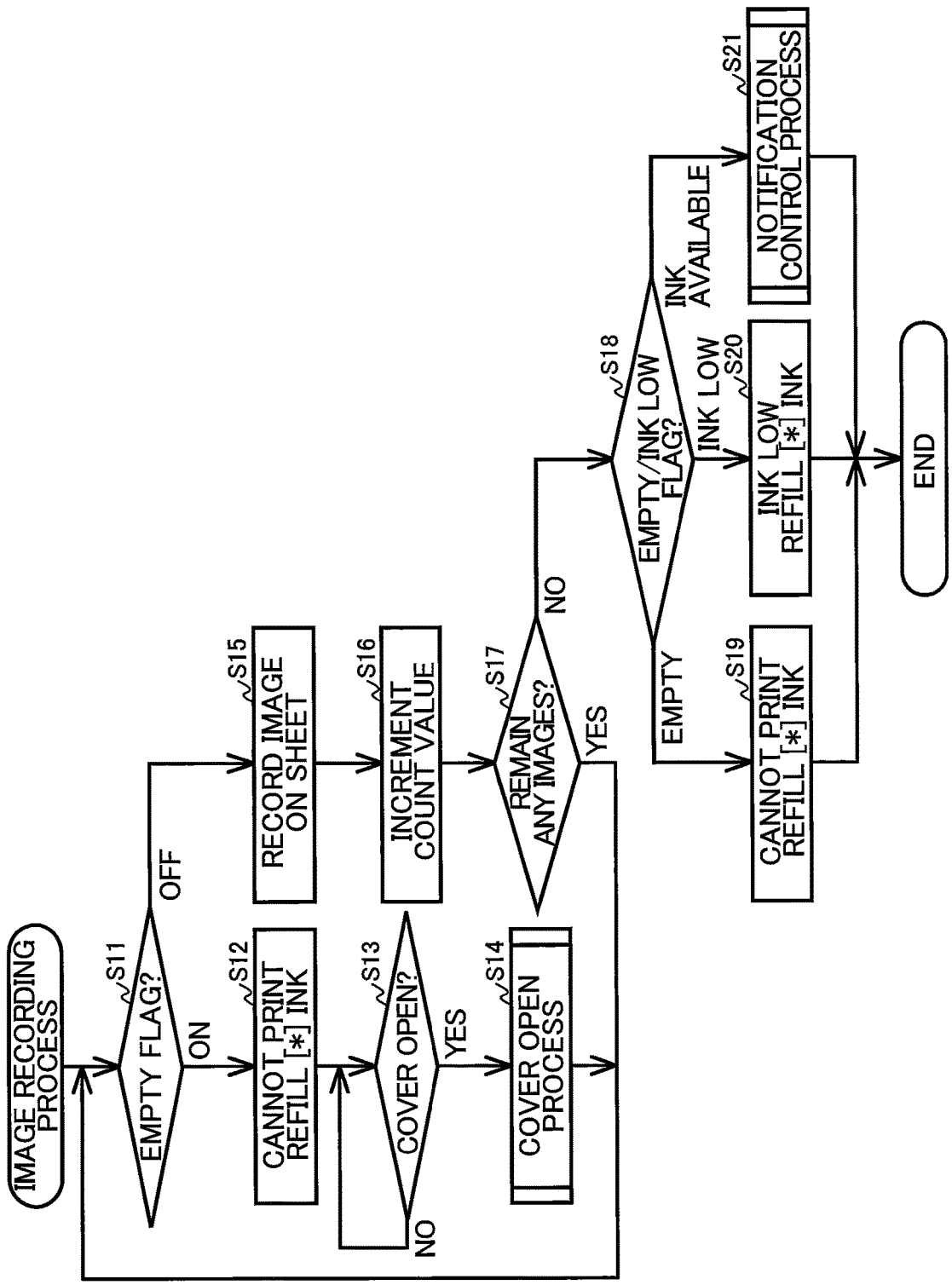
FIG. 7 is a flowchart illustrating steps in an image recording process executed by a controller 130 of the MFP 10 according to the embodiment.

The controller 130 executes the image recording process illustrated in FIG. 7 based on a recording instruction that is inputted into the MFP 10. The recording instruction is an instruction to the MFP 10 to execute a recording process for recording images on sheets based on image data. While there is no particular limitation on the source for acquiring the recording instruction, the recording instruction may be acquired from the user through the operation section 17 or may be acquired from an external device through the communication section 25, for example. In addition, the recording instruction may instruct the MFP 10 to record images on sheets based on fax data.

In S11 at the beginning of the image recording process in FIG. 7, the controller 130 determines the settings for the hard-empty flag and the soft-empty flags Y, C, and M.

Specifically, the controller 130 determines whether at least one of the hard-empty flag and the soft-empty flags Y, C, and M is set to "ON" (S11: ON) or whether all of the hard-empty flag and the soft-empty flags Y, C, and M are set to "OFF" (S11: OFF). In response to determination that at least one of the hard-empty flag and the soft-empty flags Y, C, and M is set to "ON" (S11: ON), in S12 the controller 130 controls the display section 15 to display an empty notification screen on the display section 15.

The empty notification screen is a notification screen for notifying the user that the recording process cannot be executed until ink has been refilled. More specifically, a character string "CANNOT PRINT" and a character string "REFILL [*] INK" are alternately displayed in the empty notification screen. Here, "[*]" is replaced with characters representing the colors of ink stored in the ink chambers 111. For example, the controller 130 may include characters in the empty notification screen that represent the colors of ink stored in ink chambers 111 whose corresponding hard-empty flag and soft-empty flags Y, C, and M have been set to "ON". The controller 130 controls the display section 15 to continuously display the empty notification screen on the display section 15 until the controller 130 detects the cover open event through the cover sensor 72 (S13: NO).

Next, the controller 130 detects the cover open event through the cover sensor 72 and executes a cover open process (S14) in response to the detection of the cover open event through the cover sensor 72 (S13: YES). The controller 130 executes the cover open process in response to the movement of the cover 70 from its covering position to its exposing position while the MFP 10 is in a standby state (a state in which the MFP 10 is not executing the image recording process). In other words, the controller 130 executes the cover open process in response to receipt of the second position signal from the cover sensor 72 while the MFP 10 is not executing the image recording process. The cover open process is performed to prompt the user to refill the ink chamber 111 with ink and to confirm with the user that the ink chamber 111 has been refilled. The cover open process will be described in detail with reference to FIG. 8.

<Cover Open Process>

Figure 8:
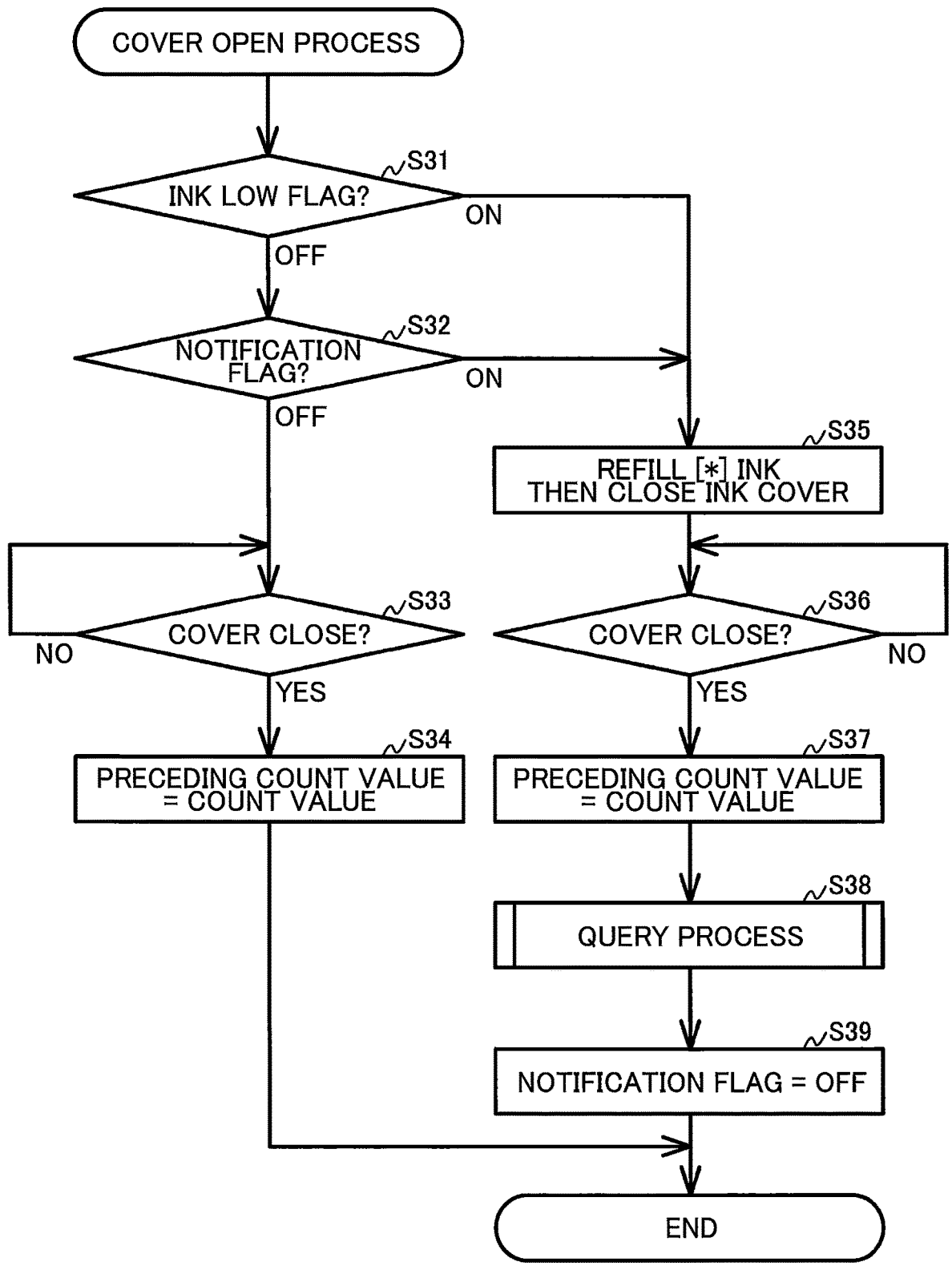
FIG. 8 is a flowchart illustrating steps in a cover open process executed by the controller 130.

In S31 at the beginning of the cover open process in FIG. 8, the controller 130 determines the settings for the ink low flags B, Y, C, and M. When the controller 130 executes this cover open process in S14 in the image recording process, at least one of the ink low flags B, Y, C, and M has been set to "ON" (S31: ON). In response to determination that at least one of the ink low flags B, Y, C, and M is set to "ON" (S31: ON), in S35 the controller 130 controls the display section 15 to display a refill notification screen on the display section 15.

A character string "REFILL [*] INK" and a character string "THEN CLOSE INK COVER" are alternately displayed in the refill notification screen, for example. Here, "[*]" is replaced with characters representing the colors of ink that need to be refilled (Bk, Y, C, and M). The controller 130 may include, in the refill notification screen, characters representing the colors of ink stored in ink chambers 111 in the ink low state. The controller 130 controls the display section 15 to continuously display the refill notification screen on the display section 15 until the controller 130 detects the cover close event through the cover sensor 72 (S36: NO).

When viewing the refill notification screen, the user removes the cap 113 from the inlet 112 of the ink chamber 111 to be refilled and injects ink into the ink chamber 111. After refilling the ink chamber 111, the user closes the inlet 112 with the cap 113 and moves the cover 70 back to the covering position. At this time, the user may refill ink of only those colors indicated in the refill notification screen, may refill ink of all colors, or may not refill ink of any color. However, the controller 130 cannot detect what colors of ink were replenished.

In response to detection of the cover close event through the cover sensor 72 (S36: YES), in S37 the controller 130 sets all preceding count values to the corresponding count values at the timing that the cover close event was detected. That is, all preceding count values are updated to the corresponding count values in S37. Further, in response to the detection of the cover close event through the cover sensor 72 (S36: YES), in S38 the controller 130 executes a query process. In the query process, the controller 130 prompts the user to indicate whether an ink chamber 111 has been refilled with ink and initializes the corresponding count value and the preceding count value based on the user's response. Next, the query process will be described in detail with reference to FIG. 9.

<Query Process>

Figure 9:
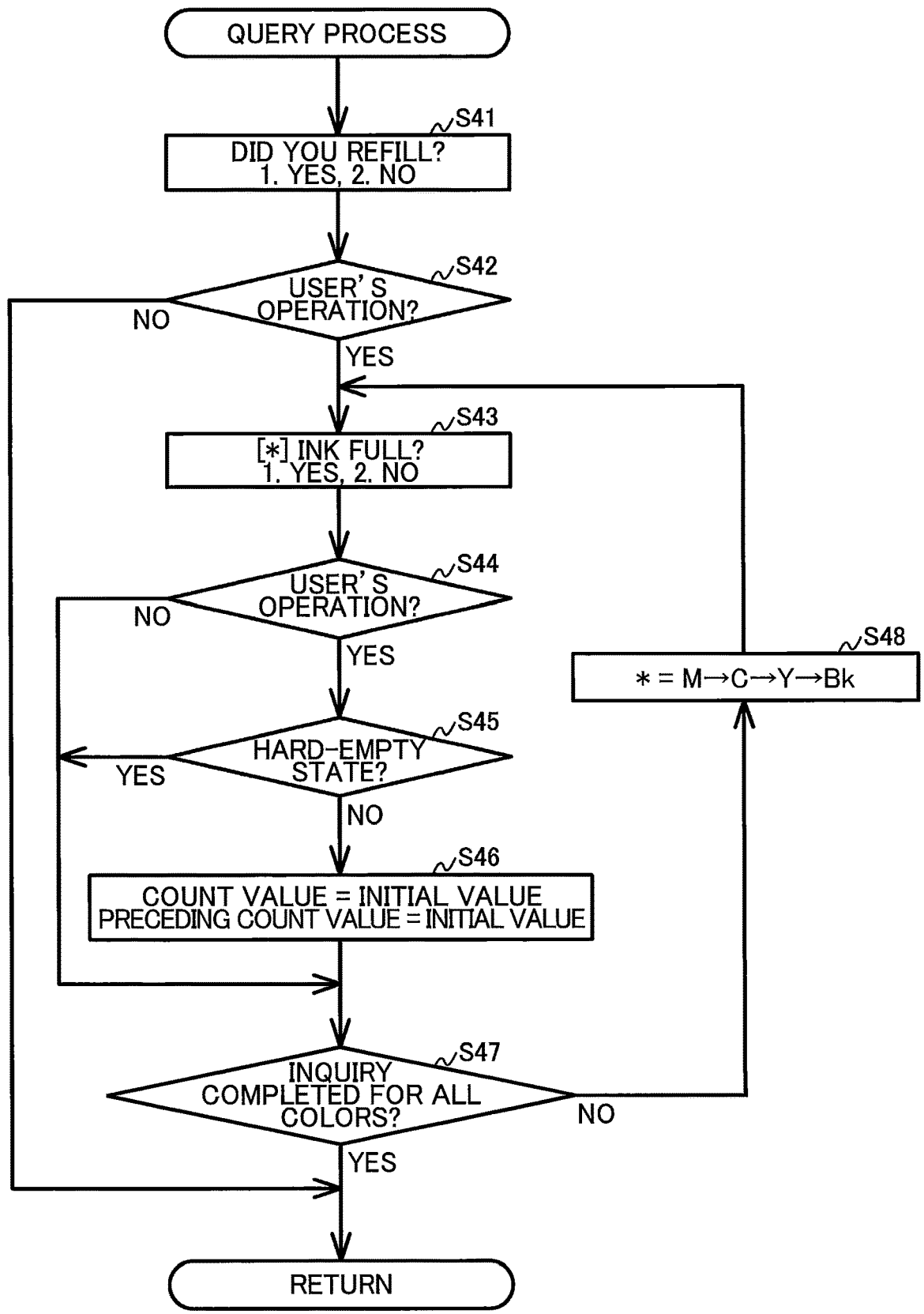
FIG. 9 is a flowchart illustrating steps in a query process executed by the controller 130.

In S41 at the beginning of FIG. 9, the controller 130 controls the display section 15 to display a preliminary inquiry screen on the display section 15. The preliminary inquiry screen prompts the user to indicate whether at least one of the ink chambers 111 has been refilled. For example, a character string "DID YOU REFILL?" and a character string "1. YES, 2. NO" are alternately displayed in the preliminary inquiry screen. The controller 130 controls the display section 15 to continuously display the preliminary inquiry screen on the display section 15 until the controller 130 receives a third operation or a fourth operation through the operation section 17 (S42).

The third operation is a user operation for indicating that at least one of the ink chambers 111 has been refilled with ink, and corresponds to pressing the [1] button, for example. The fourth operation is a user operation for indicating that none of the ink chambers 111 has been refilled with ink, and corresponds to pressing the [2] button, for example.

In response to the pressing of the [1] button while the preliminary inquiry screen is displayed (S42: YES), in S43 the controller 130 controls the display section 15 to display an inquiry screen on the display section 15 that targets the ink chamber 111M. This inquiry screen prompts the user to indicate whether the ink chamber 111M has been refilled with ink up to its maximum storage quantity. For example, a character string "M INK FULL?" and a character string "1. YES, 2. NO" are alternately displayed in the inquiry screen. The controller 130 controls the display section 15 to continuously display the inquiry screen on the display section 15 until the controller 130 receives a first operation or a second operation through the operation section 17 (S44).

The first operation is a user operation for indicating that the ink chamber 111M has been refilled with ink up to the level of its maximum storage quantity, and corresponds to pressing the [1] button, for example. The second operation is a user operation either for indicating that the ink chamber 111M has been refilled with ink but not up to the level of its maximum storage quantity in a case where the [1] button is pressed in S42 and, of the ink chambers 111, the ink chamber 111M has been refilled or for indicating that the ink chamber 111M has not been refilled in a case where the [1] button is pressed in S42 but any of the ink chambers 111 other than the ink chamber 111M has been refilled. The second operation corresponds to pressing the [2] button, for example.

Note that the first operation and the third operation may correspond to pressing the same button or may correspond to pressing different buttons. This is also true for the second operation and the fourth operation.

In response to the pressing of the [1] button while the inquiry screen targeting the ink chamber 111M is displayed (S44: YES), the controller 130 skips the process of S45 and advances to S46. In S46 the controller 130 sets the count value M to the initial value (0) and sets the soft-empty flag M and the ink low flag M to "OFF". On the other hand, in response to the pressing of the [2] button while the inquiry screen targeting the ink chamber 111M is displayed (S44: NO), then the controller 130 advances to S47 without executing the process in S45 and S46.

In S47 the controller 130 determines whether the process in S43-S46 has been completed for all colors of ink. In response to determination that the process in S43-S46 has not been performed for all colors (S47: NO), in S48 the controller 130 sets the target color to the next color in the sequence M→C→Y→Bk. In this way, the process in S43-S46 is repeated for each of the ink chambers 111M, 111C, 111Y, and 111B. While repeating the process in S43-S46, the controller 130 initializes the count value, the preceding count value, the soft-empty flag, and the ink low flag for the corresponding ink chamber 111 in response to the pressing of the [1] button, but does not initialize these values in response to the pressing of the [2] button.

Further, in response to the pressing of the [1] button during the process of S43-S46 while the inquiry screen targeting the ink chamber 111B is displayed (S44: YES), in S45 the controller 130 determines whether the ink chamber 111B is in the hard-empty state at this time. In response to the determination that the ink chamber 111B is not in the hard-empty state at this time (S45: NO), in S46 the controller 130 initializes the count value B and the preceding count value B to their initial value, and sets the hard-empty flag, the soft-empty flag B, and the ink low flag B to "OFF". On the other hand, in response to the determination that the ink chamber 111B is in the hard-empty state at the current point in time (S45: YES), the controller 130 skips S46 and advances to S47.

After the controller 130 has completed the process in S43-S46 for all the ink chambers 111 (S47: YES), the controller 130 ends the query process. Note that the sequence in which the controller 130 performs the process in S43-S46 for the ink chambers 111M, 111C, 111Y, and 111B is not limited to the above example.

Further, in response to the pressing of the [2] button while the preliminary inquiry screen is displayed (S42: NO), the controller 130 ends the query process without executing the process in S43-S48 even one time.

Referring back to FIG. 8, in S39 the controller 130 sets the notification flags to the fourth value "OFF". Subsequently, referring back to FIG. 7, the controller 130 repeats the process from SI 1. When any one of the hard-empty flag and the soft-empty flags Y, C, and M has been still set to "ON" after executing the cover open process (S11: ON), the controller 130 repeats the process from S12 described above.

On the other hand, in response to the determination that all of the hard-empty flag and the soft-empty flags Y, C, and M have been set to "OFF" (S11: OFF), in S15 the controller 130 records images on sheets based on image data included in the recording instruction. The process in S15 is an example of a recording process. Thus, the recording section 24 can eject ink when all of the hard-empty flag and the soft-empty flags Y, C, and M have been set to "OFF", but cannot eject ink when even one of the hard-empty flag and the soft-empty flags Y, C, and M has been set to "ON".

More specifically, in S15 the controller 130 controls the conveying section 23 to convey a sheet supported in the feed tray 20 to a position facing the recording section 24. Next, the controller 130 controls the recording section 24 to eject ink toward the sheet facing the recording section 24 to record an image on the sheet. Subsequently, the controller 130 controls the conveying section 23 to discharge the sheet having an image recorded by the recording section 24 into the discharge tray 21.

In addition, in S16 the controller 130 counts the quantity of ink ejected from the recording section 24 in S15 for each color and increments the corresponding count value. Accordingly, the difference between the corresponding count value and the preceding count value gradually becomes large. Note that the timing for incrementing the count values is not limited to the timing of S16. Any time ink is ejected from the recording section 24, the controller 130 increments the corresponding count values based on the quantities of ink ejected from the recording section 24, such as in a flushing process in which the recording section 24 ejects ink toward an ink receptor (not illustrated), or the maintenance process.

Here, the controller 130 sets the hard-empty flag to "ON" when the residual ink signal outputted from the residual ink sensor 73 switches from the first residual ink signal to the second residual ink signal while the recording section 24 ejects ink. Further, when the difference between any count value and the corresponding second threshold value becomes less than 0 while the count values are incremented, the controller 130 sets the corresponding ink low flag to "ON". Further, when the difference between any count value and the corresponding first threshold value becomes less than 0 while the count values are incremented, the controller 130 sets the corresponding soft-empty flag to "ON".

In S17 the controller 130 determines whether there remain any images indicated in the recording instruction that have not been recorded on sheets. Until the controller 130 records all images indicated in the recording instruction on sheets (S17: YES), the controller 130 returns to S111 and repeats the process in S11-S16 described above. After all images indicated in the recording instruction have been recorded on sheets (S17: NO), the controller 130 infers that the user is near the MFP 10. That is, the controller 130 infers that the user who inputted the recording instruction will come to the MFP 10 to retrieve the recorded sheets at the time the recording process is completed. The process in S17 is an example of the first determination process.

Here, the phrase "the user is near the MFP 10" denotes that the user is close to the MFP 10 enough to be able to read the screen displayed on the display section 15 of the MFP 10. Further, the first determination process according to the present embodiment is not a process for directly detecting the presence of the user using a motion sensor or the like, but rather is a process of inferring the presence of the user on the basis of the state of the MFP 10. However, the controller 130 may use a motion sensor or the like in the first determination process to detect directly when the user is near the MFP 10.

In response to the determination that the user is near the MFP 10 based on the status of the MFP 10 (S17: NO), in S18 the controller 130 determines the settings for the hard-empty flag, the soft-empty flags Y, C, and M, and the ink low flags B, Y, C, and M. In response to determination that any one of the hard-empty flag and the soft-empty flags Y, C, and M has been set to "ON" (S18: Empty), in S19 the controller 130 controls the display section 15 to display the empty notification screen on the display section 15. However, in response to the determination that all of the hard-empty flag and the soft-empty flags Y, C, and M have been set to "OFF" but any one of the ink low flags B, Y, C, and M has been set to "ON" (S18: Ink low), in S20 the controller 130 controls the display section 15 to display an ink low notification screen on the display section 15.

The empty notification screen displayed in S19 may be identical to that displayed in S12. The ink low notification screen is a screen for notifying the user that the ink chamber 111 is approaching the soft-empty state. Specifically, a character string "INK LOW" and a character string "REFILL [*] INK" are alternately displayed in the ink low notification screen. Here, "[*]" is replaced with characters representing the colors of ink stored in ink chambers 111 in the ink low state.

The controller 130 controls the display section 15 to continuously display the empty notification screen or the ink low notification screen on the display section 15 until one of the following events occurs: the cover open event is detected through the cover sensor 72, the recording instruction is inputted, the operation section 17 is operated, or the state of the power supply section 120 changes to a state other than the drive state (i.e., the idle state, the switch OFF state, or the plug OFF state). The empty notification screen and the ink low notification screen are an example of a second notification screen for notifying the user that the ink need to be refilled.

On the other hand, in response to the determination that all of the hard-empty flag, the soft-empty flags Y, C, and M, and the ink low flags B, Y, C, and M have been set to "OFF" (S18: Ink available), in S21 the controller 130 executes a notification control process. Hence, the notification control process is executed when the user is near the MFP 10 and all of the ink chambers 111 contain a quantity of ink greater than or equal to the residual ink threshold, specifically, none of the ink chambers 111 are in the ink low state. The notification control process is a process for notifying the user that ink levels in the ink tanks 100 should be checked if prescribed conditions are met. Next, the notification control process will be described in detail with reference to FIG. 10.

<Notification Control Process>

Figure 10:
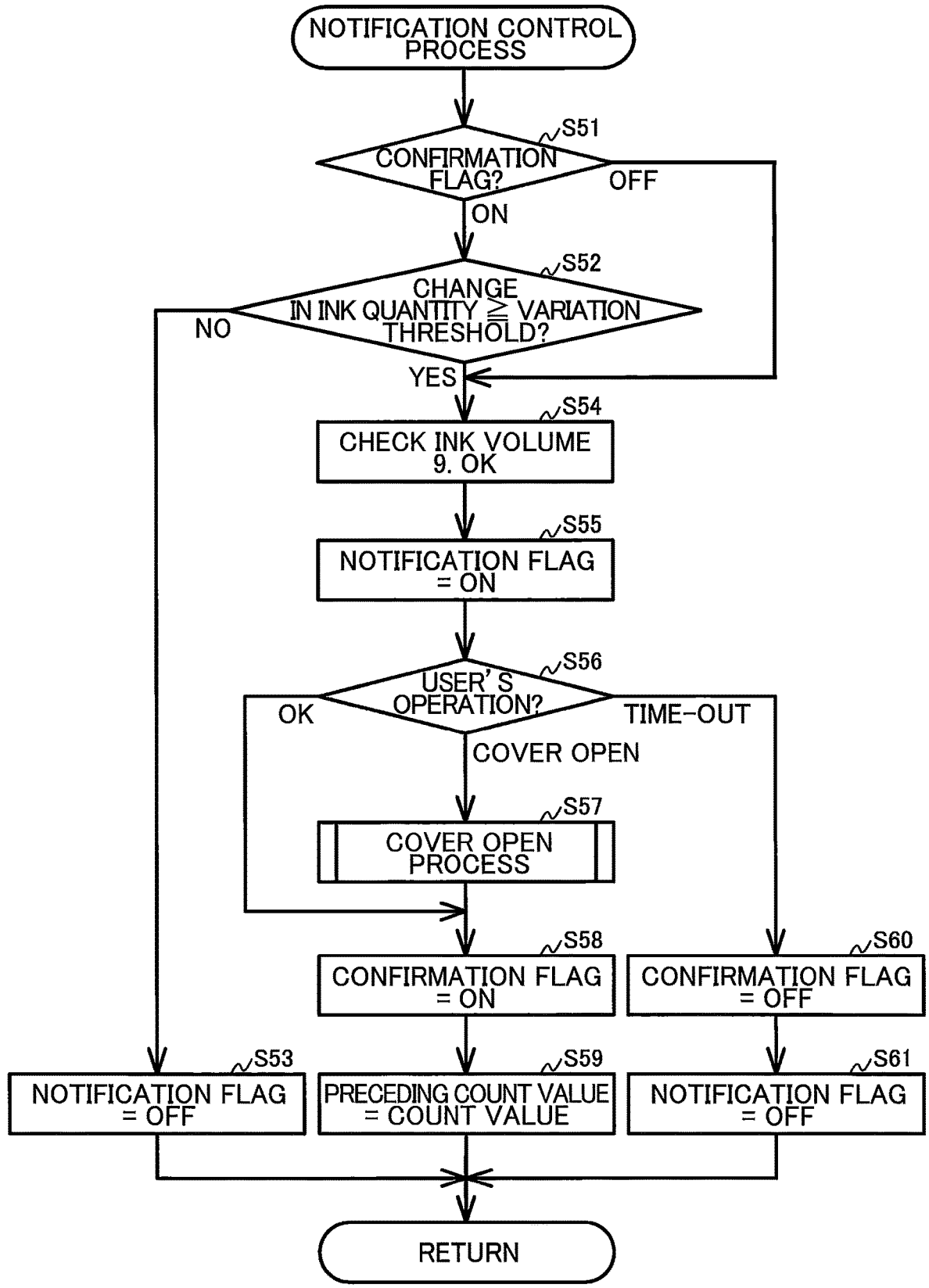
FIG. 10 is a flowchart illustrating steps in a notification control process executed by the controller 130.

In S51 at the beginning of the process in FIG. 10, the controller 130 determines the setting for the confirmation flag. More specifically, the controller 130 determines whether the confirmation flag is set to "ON" (the first value) or "OFF" (the second value). In response to determination that the confirmation flag is set to "ON" (S51: ON), in S52 the controller 130 determines whether the change in ink quantity for at least one of the ink chambers 111 is greater than or equal to a variation threshold. That is, the controller 130 determines whether the difference between the count value and the corresponding preceding count value for any of the ink chambers 111 is greater than or equal to the variation threshold. Here, the value of the preceding value indicating the value of the count value at a time the process in S52 was most recently executed. That is, in S52 the controller 130 determines whether a change of amount in the count value (i.e., a difference between the count value at a current time and the count value at a time the notification process was most recently executed) is equal to or greater than the variation threshold. The process in S52 is an example of a second determination process. The variation threshold in the present embodiment is a fixed value predetermined by the developer of the MFP 10, for example.

In response to determination that the change in ink quantity for all ink chambers 111 is less than the variation threshold (S52: NO), in S53 the controller 130 sets the notification flag to "OFF" (the fourth value). Subsequently, the controller 130 ends the notification control process without executing the process in S54-S61.

On the other hand, in response to the determination that the change in ink quantity for any of the ink chambers 111 is greater than or equal to the variation threshold (S52: YES), in S54 the controller 130 controls the display section 15 to display the residual ink confirmation screen on the display section 15. Further, in S51, in response to the determination that the confirmation flag is set to "OFF" (S51: OFF), the controller 130 skips the determination in S52 and advances to S54.

In S55 the controller 130 sets the notification flag to "ON" (the third value). The process in S54 is an example of a notification process.

The residual ink confirmation screen is an example of a notification screen for notifying the user that the levels of ink in the ink chambers 111 needs to be checked. For example, a character string "CHECK INK VOLUME" and a character string "9. OK" are alternately displayed in the residual ink confirmation screen. The controller 130 controls the display section 15 to continuously display the residual ink confirmation screen on the display section 15 until one of the following events occurs: the cover open event is detected, a confirmation operation is received through the operation section 17, or a prescribed time has elapsed (S56). The confirmation operation is a user operation indicating that information displayed in the residual ink confirmation screen is confirmed, and corresponds to pressing the [9] button, for example.

As an example, when viewing the residual ink confirmation screen, the user may visually inspect the levels of ink in the ink chambers 111 through the transparent window 71. If all of the ink chambers 111 currently store sufficient levels of ink, the user may press the [9] button. To the contrary, if the quantity of the ink stored in any one of the four ink chambers 111 is low, the user may move the cover 70 to the exposing position and refill the ink chamber 111 with ink. As another example, when viewing the residual ink confirmation screen, the user may immediately move the cover 70 to the exposing position and visually inspect the levels of ink in the ink chambers 111.

When the controller 130 detects the cover open event through the cover sensor 72 while the residual ink confirmation screen is displayed (S56: Cover open), in S57 the controller 130 executes the cover open process. Here, since the process performed in the cover open process when one or more of the ink low flags B, Y, C, and M is set to "ON" (S31: ON) has been described above, a description of this process is omitted to avoid duplicating description.

In response to determination that all of the ink low flags B, Y, C, and M are set to "OFF" (S31: OFF), in S32 the controller 130 determines the setting for the notification flag (S32). More specifically, the controller 130 determines whether the notification flag is set to "ON" (the third value) or "OFF" (the fourth value). When the cover open process is executed in S57 of the notification control process, the notification flag is always set to "ON" (the third value; S32: ON). In response to determination that the notification flag is set to "ON" (S32: ON), the controller 130 executes the process in S35-S39 described above.

Referring back to FIG. 10, in S58 the controller 130 sets the confirmation flag to "ON" (the first value) and in S59 sets the preceding count value for all ink chambers 111 to the corresponding count value at the timing the cover open process has been completed. Subsequently, the controller 130 ends the notification control process. Thus, in S59 all preceding count values are overwritten by the corresponding count values, irrespective of whether the preceding count values were initialized in S46 of the query process executed in the preceding cover open process. The process in S58 is an example of a first setting process.

On the other hand, in response to the pressing of the [9] button while the residual ink confirmation screen is displayed (S56: OK), the controller 130 skips the process in S57, executes the process in S58 and S59 described above, and subsequently ends the notification control process. When the prescribed time for displaying the residual ink confirmation screen elapses before the controller 130 detects the cover open event or pressing of the [9] button (S56: Time-out), in S60 the controller 130 sets the confirmation flag to "OFF" (the second value), in S61 sets the notification flag to "OFF" (the fourth value), and subsequently ends the notification control process. The process in S60 is an example of a second setting process.

Hence, the controller 130 determines that the user has confirmed the content in the residual ink confirmation screen in response to the determination that the cover open event is detected through the cover sensor 72 while the residual ink confirmation screen is displayed (S56: Cover open) or the [9] button is pressed while the residual ink confirmation screen is displayed (S56: OK). On the other hand, the controller 130 determines that the user did not confirm the content in the residual ink confirmation screen in response to the determination that the cover open event was not detected and the [9] button was not pressed prior to the prescribed time elapsing after the residual ink confirmation screen was displayed.

However, the method of determining that the user did not confirm the content of the residual ink confirmation screen is not limited to a time-out event. As another example, the controller 130 may determine that the user did not confirm the content in the residual ink confirmation screen in response to the determination that: a recording instruction is inputted into the MFP 10 while the residual ink confirmation screen is displayed, a user operation other than the pressed [9] button is received through the operation section 17, or the power supply section 120 is switched to the switch OFF state or the idle state.

Note that the user can move the cover 70 to the exposing position at a timing different from that in S13 and S56. When the controller 130 detects the cover open event through the cover sensor 72 at a different timing than S13 and S56, the controller 130 executes the cover open process. Since the processes performed when at least one of the ink low flags B, Y, C, and M is set to "ON" (S31: ON) and when the notification flag is set to "ON" (S32: ON) have already been described, a description of these processes is omitted to avoid duplicating description.

In response to determination that all of the ink low flags B, Y, C, and M are set to "OFF" and the notification flag is set to "OFF" (S31: OFF and S32: OFF), the controller 130 continues to wait until the cover close event is detected through the cover sensor 72 (S33: NO). When the controller 130 detects the cover close event (S33: YES), in S34 the controller 130 sets the preceding count value for all ink chambers 111 to the corresponding count value at the timing the cover close event was detected. Subsequently, the controller 130 ends the cover open process without executing the process in S35-S39.

Operational and Technical Advantages of the Embodiment

In the embodiment described above, the controller 130 periodically prompts the user to check the residual ink quantities in the ink chambers 111 when the user comes in the vicinity of the MFP 10. Accordingly, the user is expected to perform an operation to refill ink chambers 111 before the levels of ink stored therein drop below the openings formed in the ends of the corresponding ink supply portions 151. Accordingly, air introduction in the ink can be suppressed even if the count values were not accurately updated. The controller 130 also periodically displays the residual ink confirmation screen during a stage in which the residual ink quantity is relatively high, and can more strongly urge the user to refill ink through the ink low notification screen or the empty notification screen when the levels of ink become low.

When the controller 130 executes the recording process, it is likely that the user comes to the MFP 10 to retrieve sheets on which images have been recorded. In addition, there is a high probability that the user who inputs a recording instruction to the MFP 10 is interested in operating the MFP 10 without any problem. Accordingly, the user is expected to perform an operation for refilling the ink chambers 111 with ink by displaying the residual ink confirmation screen on the display section 15 at such a timing when the user comes in the vicinity of the MFP 10. Note that the controller 130 may determine that the user is near the MFP 10 at a timing other than the timing when the image recording process has been completed. For example, the controller 130 may determine that the user is near the MFP 10 at a timing that a recording instruction is inputted and execute the notification control process.

However, if the controller 130 displays the residual ink confirmation screen on the display section 15 each time the controller 130 determines that the user is near the MFP 10, the user's operational load in checking the residual ink quantities in the ink chambers 111 may be increased. In addition, if the user is required to check the residual ink quantities in the ink chambers 111 regardless of the change in residual ink quantities, the user may tend to ignore the residual ink confirmation screen even if the residual ink confirmation screen is displayed on the display section 15. Accordingly, the controller 130 skips the process in S54 unless the count value is incremented to reach the variation threshold since the process in S54 was most recently executed. Consequently, the controller 130 can prompt the user at a suitable timing to check the residual ink quantities in the ink chambers 111.

In the above-described embodiment, the controller 130 can determine whether the user inspected the residual ink confirmation screen by using the setting for the confirmation flag. If the user has not inspected the residual ink confirmation screen, the controller 130 repeats the process in S54 at a time that the user comes in the proximity of the MFP 10, irrespective of the magnitude of change in ink quantities. In this way, the controller 130 can more effectively prompt the user to refill ink chambers 111. On the other hand, if the user has inspected the residual ink confirmation screen when the residual ink confirmation screen is most recently displayed on the display section 15, the controller 130 can execute the subsequent process in S54 at a suitable time interval.

The timing when the controller 130 infers that the user comes in the vicinity of the MFP 10 is not limited to the above example. As other examples, the controller 130 may determine that the user comes in the vicinity of the MFP 10 in response to the determination that: the power supply section 120 is switched from one of the switch ON state and the switch OFF state to the other (i.e., when the power button 17B is operated), or the power supply section 120 shifts from the idle state to the drive state.

When the power button 17B is operated or the power supply section 120 shifts from the idle state to the drive state, it is likely that the user is near the MFP 10. Further, it is also likely that the user is a main user for operating the MFP 10 or an administrator of the MFP 10, and is interested in operating the MFP 10 without any problems. Hence, the controller 130 can display the residual ink confirmation screen on the display section 15 at such a timing that the user is near the MFP 10, and the user is expected to perform the operation for refilling the ink chambers 111 with ink.

Figure 11:
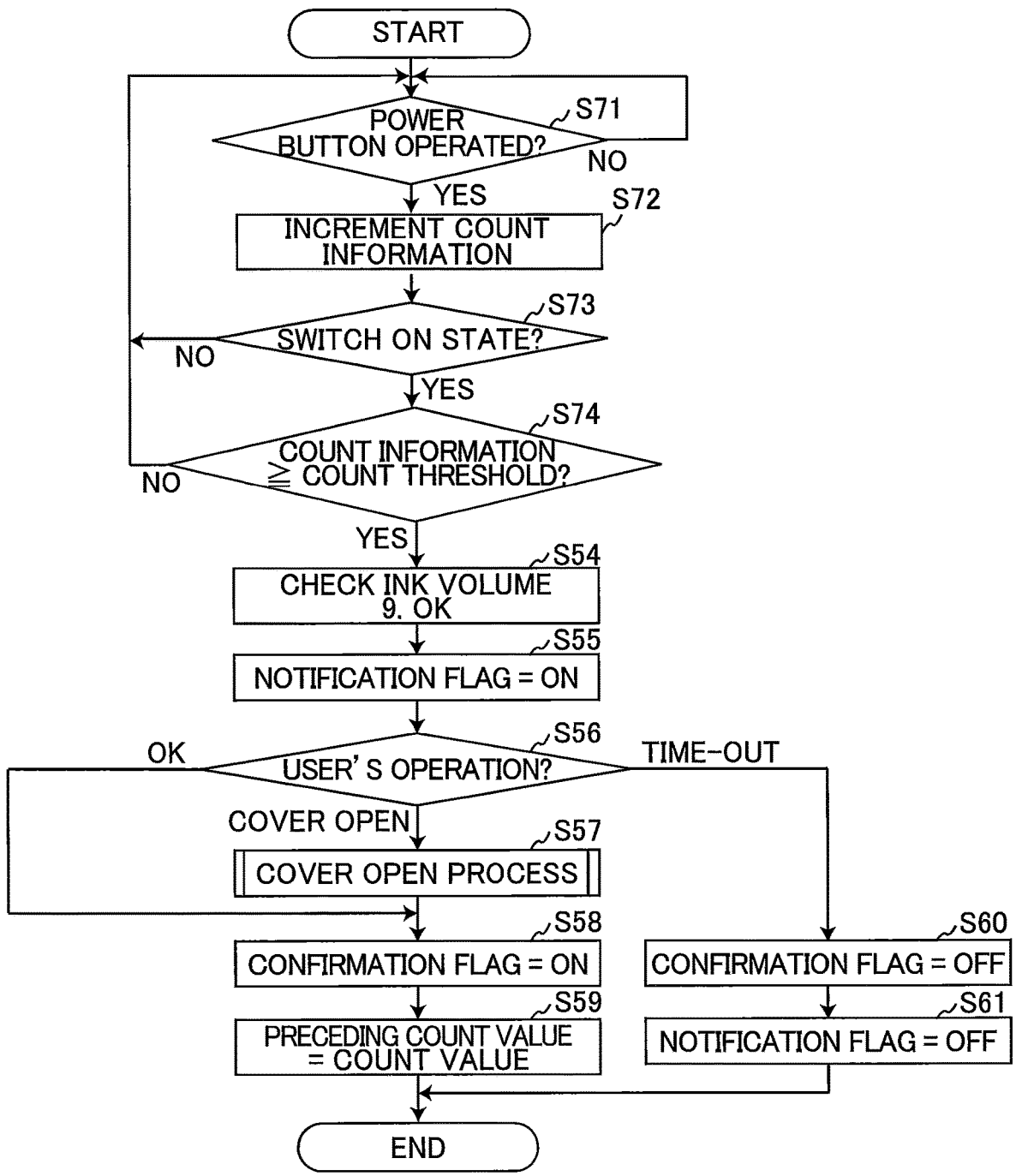
FIG. 11 is a flowchart illustrating steps according to a variation of the embodiment.

However, if the controller 130 displays the residual ink confirmation screen on the display section 15 every time the power button 17B is operated, this may cause the increase of the user's operational load in checking the residual ink quantities in the ink chambers 111. Hence, the controller 130 may execute processes illustrated in FIG. 11. In S71 at the beginning of the processes in FIG. 11, the controller 130 determines whether the power button 17B is operated. In response to the determination that the power button 17B is operated (S71: YES), in S72 the controller 130 increments count information stored in the EEPROM 134. This process in S72 is an example of a count process. In other words, the controller 130 increments count information indicating the number of operations of the power button 17B each time the power button 17B is operated. Thereafter, in S73 the controller 130 determines whether the power supply section 120 is switched to the switch ON state through the operation of the power button 17B. In response to the determination that the power supply section 120 is switched to the switch ON state (S73: YES), then in S74 the controller 130 determines whether the number of operations of the power button 17B indicated by the count information reaches a count threshold (for example, 10 times). This process in S74 is an example of a second determination process.

Subsequently, in response to the determination that the number of operations of the power button 17B reaches the count threshold (S74: YES), the controller 130 executes the processes from S54.

In response to the determination that the power supply section 120 is switched from the switch ON state to the switch OFF state through the operation of the power button 17B (S73: NO) or the number of operations of the power button 17B indicated by the count information does not reach the count threshold (S74: NO), the controller 130 waits until the power button 17B is operated to switch the power supply section 120 to the switch ON state.

Through this operation, the controller 130 can execute the process in S54 at suitable time intervals. Note that, in the count process, the controller 130 may count the operation of the power button 17B for switching the power supply section 120 from the switch OFF state to the switch ON state and the operation for switching the power supply section 120 from the switch ON state to the switch OFF state as different values, or may count these operations as the same value.

Figure 12:
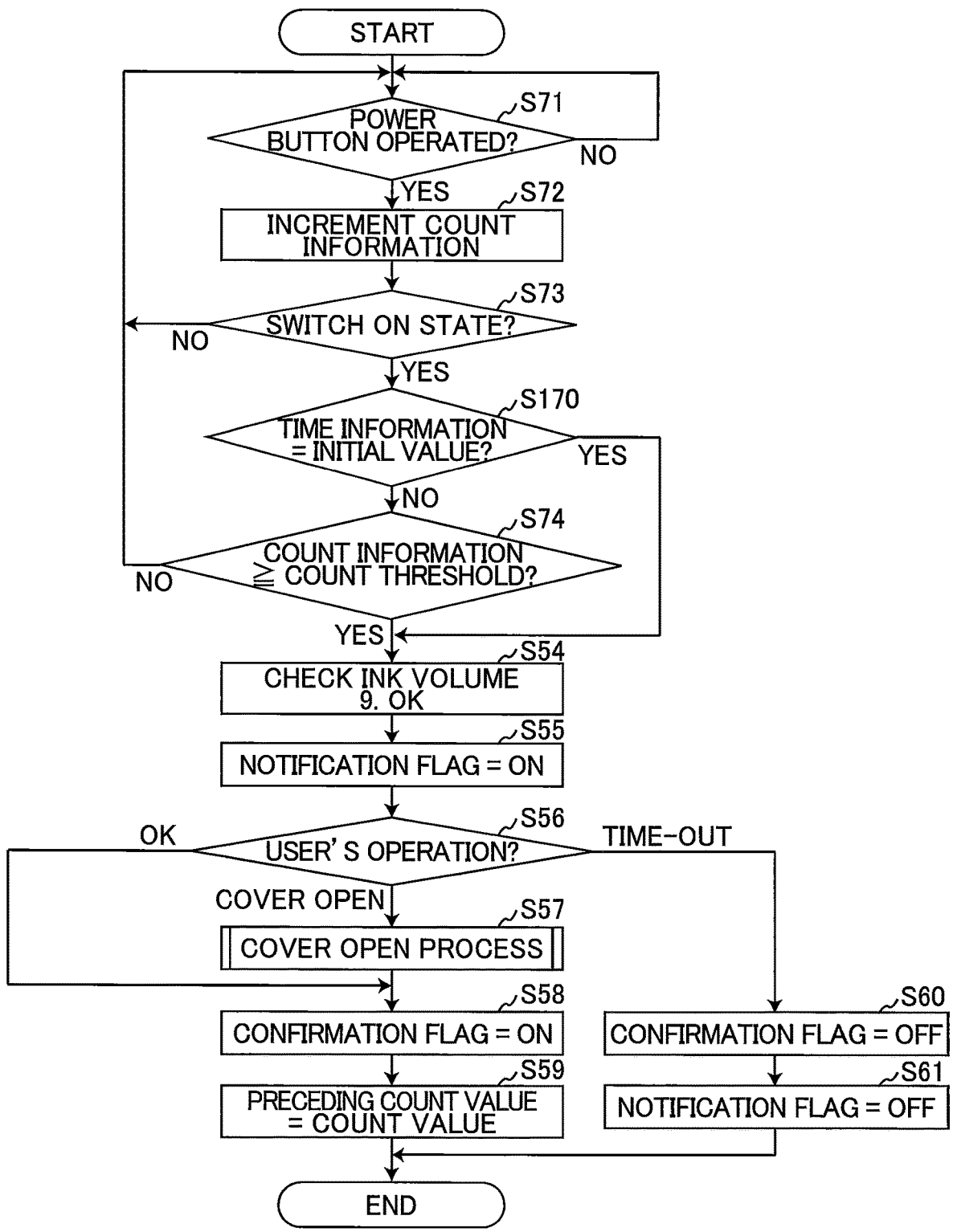
FIG. 12 is a flowchart illustrating steps according to another variation of the embodiment.

As a variation, the controller 130 may obtain time information from the internal clock 135 in response to receipt of the operation of the power button 17B for switching the power supply section 120 from the switch OFF state to the switch ON state, as illustrated in FIG. 12. In the processes in FIG. 12, the controller 130 executes the determination in S170 before executing the process in S74 of FIG. 11. More specifically, in response to the determination that the power supply section 120 is in the switch ON state (S73: YES), in S170 the controller 130 determines whether the time information outputted from the internal clock 135 is set to the initial value. In response to the determination that the time information obtained from the internal clock 135 is not set to the initial value (S170: NO), in S74 the controller 130 determines whether the number of operations of the power button 17B reaches the count threshold. On the other hand, in response to the determination that the time information obtained from the internal clock 135 is reset to the initial value (S170: YES), the controller 130 executes the process in S54 without executing the process in S74. In other words, when the time information is set to the initial value, the controller 130 controls the display section 15 to display the residual ink confirmation screen regardless of the number of operations of the power button 17B.

The time information outputted from the internal clock 135 is reset to the initial value when the charge in the internal power supply 121 is depleted, for example. That is, the power supply section 120 may have stayed in the switch OFF state for a long time. In such a case, it is preferable that the controller 130 executes the process in S54 regardless of the numbers of operations of the power button 17B, since there is a probability that ink is injected to the ink chambers 111 during the switch OFF state of the power supply section 120, or ink stored in the ink chambers 111 is deteriorated.

The above-mentioned embodiment describes an example in which the ink detection portion 152 and the residual ink sensor 73 are only provided for the tank 100B. However, the ink detection portion 152 and the residual ink sensor 73 may be provided for each of the tanks 100B, 100Y, 100C, and 100M or for none of the tanks 100B, 100Y, 100C, and 100M. When the ink detection portions 152 and the residual ink sensors 73 are provided for all of the tanks 100B, 100Y, 100C, and 100M, in S45 the controller 130 may determine the residual ink signals from the residual ink sensors 73 corresponding to the ink chambers 111 targeted in the corresponding processes S43-46. On the other hand, if the ink detection portion 152 and the residual ink sensor 73 are not provided for any of the ink chambers 111, the processes in S45 may be omitted.

In the embodiment described above, the controller 130 determines the settings for the hard-empty flag, the soft-empty flags Y, C, and M, and the ink low flags B, Y, C, and M in steps S11, S18, and S31. However, the specific method of determination in S11, S18, and S31 is not limited to the above example. For example, when the ink detection portion 152 and the residual ink sensor 73 are provided for each of the tanks 100B, 100Y, 100C, and 100M, in S11, and S18 the controller 130 may employ hard-empty flags Y, C, and M in place of the soft-empty flags Y, C, and M. However, when the ink detection portion 152 and the residual ink sensor 73 are not provided for any of the tanks 100B, 100Y, 100C, and 100M, in S11, and S18 the controller 130 may employ a soft-empty flag B in place of the hard-empty flag.

As another variation, rather than determining the settings of the flags in S11, S18, and S31, the controller 130 may determine whether the ink chambers 111 are in the hard-empty state, the soft-empty state, or the ink low state. Specifically, in S11, S18, and S31 the controller 130 may determine whether the difference between the count value and either the first threshold value or the second threshold value is greater than or equal to 0 for each of the ink chambers 111B, 111Y, 111C, and 111M. Alternatively, the controller 130 may determine in S11 whether the residual ink signal outputted from the residual ink sensor 73 is the first residual ink signal (S11: OFF) or the second residual ink signal (S11: ON).

While the description has been made in detail with reference to the embodiment(s) thereof, it would be apparent to those skilled in the art that many modifications and variations may be made therein without departing from the scope of the disclosure.

What is claimed is:

1. An inkjet recording apparatus comprising:
a tank having an ink chamber configured to store ink therein and formed with an inlet through which the ink is injected into the ink chamber, the tank having an outer wall, the outer wall having at least a portion allowing the ink stored in the ink chamber to be visible from an outside;
a recording head configured to eject the ink stored in the ink chamber to record an image on a sheet;
a display configured to display a screen; and
a controller configured to control the recording head and the display, the controller being further configured to:
execute a first determination process to determine whether a user is near the inkjet recording apparatus; and
execute, after determination in the first determination process that the user is near the inkjet recording apparatus, a notification process to control the display to display a notification screen when the quantity of ink stored in the ink chamber is not less than a residual ink threshold, the notification screen prompting the user to check the quantity of ink stored in the ink chamber.

2. The inkjet recording apparatus according to claim 1, wherein the recording head is controlled to eject the ink stored in the ink chamber provided that a quantity of ink stored in the ink chamber is not less than the residual ink threshold.

3. The inkjet recording apparatus according to claim 1, wherein the controller is further configured to:
receive a recording instruction to record an image on a sheet; and
execute, in response to receipt of the recording instruction, a recording process to control the recording head to record an image on a sheet, and
wherein, in the first determination process, the user is inferred to be near the inkjet recording apparatus when the recording instruction is received.

4. The inkjet recording apparatus according to claim 3, further comprising a memory storing a first threshold value and a count value, the count value being indicative of an accumulated count value accumulated from an initial value and being updated in a direction approaching the first threshold value in accordance with ejection of ink,
wherein the controller is further configured to:
execute, in response to determination in the first determination process that the user is near the inkjet recording apparatus, a second determination process to determine whether an amount of change in the count value is not less than a variation threshold, the amount of change in the count value being a difference between the count value at a current time and the count value at a time the notification process was most recently executed; and
execute, in response to determination in the second determination process that the amount of change in the count value is not less than the variation threshold, the notification process.

5. The inkjet recording apparatus according to claim 4, wherein the memory further stores a confirmation flag, and wherein the controller is further configured to:

receive a confirmation operation indicating that the notification screen has been confirmed before a prescribed time elapses since the notification process is executed;
execute, in response to receipt of the confirmation operation, a first setting process to set the confirmation flag to a first value;
execute, in response to determination that the prescribed time has elapsed before receiving the confirmation operation, a second setting process to set the confirmation flag to a second value;
execute, in response to determination in the first determination process that the user is near the inkjet recording apparatus and in response to determination that the confirmation flag is set to the first value, the second determination process; and
execute, in response to determination in the first determination process that the user is near the inkjet recording apparatus and in response to determination that the confirmation flag is set to the second value, the notification process without executing the second determination process.

6. The inkjet recording apparatus according to claim 1, wherein the controller is further configured to:
receive a recording instruction to record an image on a sheet; and
execute, in response to receipt of the recording instruction, a recording process to control the recording head to record an image on a sheet, and
wherein, in the first determination process, the user is inferred to be near the inkjet recording apparatus when the recording process has been completed.

7. The inkjet recording apparatus according to claim 6, further comprising a memory storing a first threshold value and a count value, the count value being indicative of an accumulated count value accumulated from an initial value and being updated in a direction approaching the first threshold value in accordance with ejection of ink,
wherein the controller is further configured to:
execute, in response to determination in the first determination process that the user is near the inkjet recording apparatus, a second determination process to determine whether an amount of change in the count value is not less than a variation threshold, the amount of change in the count value being a difference between the count value at a current time and the count value at a time the notification process was most recently executed; and
execute, in response to determination in the second determination process that the amount of change in the count value is not less than the variation threshold, the notification process.

8. The inkjet recording apparatus according to claim 7, wherein the memory, further stores a confirmation flag, and wherein the controller is further configured to:
receive a confirmation operation indicating that the notification screen has been confirmed before a prescribed time elapses since the notification process is executed;
execute, in response to receipt of the confirmation operation, a first setting process to set the confirmation flag to a first value;
execute, in response to determination that the prescribed time has elapsed before receiving the confirmation operation, a second setting process to set the confirmation flag to a second value;

execute, in response to determination in the first determination process that the user is near the inkjet recording apparatus and in response to determination that the confirmation flag is set to the first value, the second determination process; and execute, in response to determination in the first determination process that the user is near the inkjet recording apparatus and in response to determination that the confirmation flag is set to the second value, the notification process without executing the second determination process.

9. The inkjet recording apparatus according to claim 1, further comprising a power button configured to switch a power supply section between a switch OFF state and a switch ON state, wherein, in the first determination process, the user is inferred to be near the inkjet recording apparatus when the power button is operated.

10. The inkjet recording apparatus according to claim 9, wherein the controller is further configured to:

determine whether the power button is operated;

execute, in response to determination that the power button is operated, a count process to update count information corresponding to a number of operations of the power button;

execute, in response to execution of the count process, a second determination process to determine whether the count information reaches a count threshold; and execute, in response to determination in the second determination process that the count information reaches the count threshold, the notification process.

11. The inkjet recording apparatus according to claim 10, further comprising a memory storing a confirmation flag, wherein the controller is further configured to:

receive a confirmation operation indicating that the notification screen has been confirmed before a prescribed time elapses since the notification process is executed;

execute, in response to receipt of the confirmation operation, a first setting process to set the confirmation flag to a first value;

execute, in response to determination that the prescribed time has elapsed before receiving the confirmation operation, a second setting process to set the confirmation flag to a second value;

execute, in response to determination in the first determination process that the user is near the inkjet recording apparatus and in response to determination that the confirmation flag is set to the first value, the second determination process; and execute, in response to determination in the first determination process that the user is near the inkjet recording apparatus and in response to determination that the confirmation flag is set to the second value, the notification process without executing the second determination process.

12. The inkjet recording apparatus according to claim 10, further comprising an internal power supply configured to store an electric power supplied from an external power source, wherein the controller includes an internal clock configured to output time information, the controller being further configured to:

update the time information by using the electric power stored in the internal power supply in a state where the electric power is not supplied from the external power source;

set the time information to an initial value in a state where the electric power is not supplied from the external power source and when the electric power stored in the internal power supply has been depleted;

receive an operation of the power button instructing to receive the electric power from the external power source;

determine, in response to receipt of the operation of the power button instructing to receive the electric power from the external power source, whether the time information outputted from the internal clock is set to the initial value;

execute, in response to determination that the time information outputted from the internal clock is not set to the initial value, the second determination process; and execute, in response to determination that the time information outputted from the internal clock is set to the initial value, the notification process without executing the second determination process.

13. The inkjet recording apparatus according to claim 12, further comprising a memory storing a confirmation flag, wherein the controller is further configured to:

receive a confirmation operation indicating that the notification screen has been confirmed before a prescribed time elapses since the notification process is executed;

execute, in response to receipt of the confirmation operation, a first setting process to set the confirmation flag to a first value;

execute, in response to determination that the prescribed time has elapsed before receiving the confirmation operation, a second setting process to set the confirmation flag to a second value;

execute, in response to determination in the first determination process that the user is near the inkjet recording apparatus and in response to determination that the confirmation flag is set to the first value, the second determination process; and execute, in response to determination in the first determination process that the user is near the inkjet recording apparatus and in response to determination that the confirmation flag is set to the second value, the notification process without executing the second determination process.

14. The inkjet recording apparatus according to claim 1, wherein, in the first determination process, the user is inferred to be near the inkjet recording apparatus when the inkjet recording apparatus shifts from an idle state to a drive state.

15. The inkjet recording apparatus according to claim 14, further comprising a power button configured to switch a power supply section between a switch OFF state and a switch ON state, wherein the controller is further configured to:

determine whether the power button is operated;

execute, in response to determination that the power button is operated, a count process to update count information corresponding to a number of operations of the power button;

execute, in response to execution of the count process, a second determination process to determine whether the count information reaches a count threshold; and execute, in response to determination in the second determination process that the count information reaches the count threshold, the notification process.

16. The inkjet recording apparatus according to claim 15, further comprising a memory storing a confirmation flag, wherein the controller is further configured to:

receive a confirmation operation indicating that the notification screen has been confirmed before a prescribed time elapses since the notification process is executed;

execute, in response to receipt of the confirmation operation, a first setting process to set the confirmation flag to a first value;

execute, in response to determination that the prescribed time has elapsed before receiving the confirmation operation, a second setting process to set the confirmation flag to a second value;

execute, in response to determination in the first determination process that the user is near the inkjet recording apparatus and in response to determination that the confirmation flag is set to the first value, the second determination process; and execute, in response to determination in the first determination process that the user is near the inkjet recording apparatus and in response to determination that the confirmation flag is set to the second value, the notification process without executing the second determination process.

17. The inkjet recording apparatus according to claim 15, further comprising an internal power supply configured to store an electric power supplied from an external power source, wherein the controller includes an internal clock configured to output time information, the controller being further configured to:

update the time information by using the electric power stored in the internal power supply in a state where the electric power is not supplied from the external power source;

set the time information to an initial value in a state where the electric power is not supplied from the external power source and when the electric power stored in the internal power supply has been depleted;

receive an operation of the power button instructing to receive the electric power from the external power source;

determine, in response to receipt of the operation of the power button instructing to receive the electric power from the external power source, whether the time information outputted from the internal clock is set to the initial value;

execute, in response to determination that the time information outputted from the internal clock is not set to the initial value, the second determination process; and execute, in response to determination that the time information outputted from the internal clock is set to the initial value, the notification process without executing the second determination process.

18. The inkjet recording apparatus according to claim 17, further comprising a memory storing a confirmation flag, wherein the controller is further configured to:

receive a confirmation operation indicating that the notification screen has been confirmed before a prescribed time elapses since the notification process is executed;

execute, in response to receipt of the confirmation operation, a first setting process to set the confirmation flag to a first value;

execute, in response to determination that the prescribed time has elapsed before receiving the confirmation operation, a second setting process to set the confirmation flag to a second value;

execute, in response to determination in the first determination process that the user is near the inkjet recording apparatus and in response to determination that the confirmation flag is set to the first value, the second determination process; and execute, in response to determination in the first determination process that the user is near the inkjet recording apparatus and in response to determination that the confirmation flag is set to the second value, the notification process without executing the second determination process.

* * * * *